United States Patent
Kim et al.

(10) Patent No.: US 11,031,976 B2
(45) Date of Patent: *Jun. 8, 2021

(54) METHOD FOR TRANSMITTING FEEDBACK INFORMATION FOR DM-RS BASED OPEN-LOOP DOWNLINK TRANSMISSION IN WIRELESS COMMUNICATION SYSTEM, AND APPARATUS THEREFOR

(71) Applicant: LG ELECTRONICS INC., Seoul (KR)

(72) Inventors: Hyungtae Kim, Seoul (KR); Kijun Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,562

(22) Filed: Dec. 18, 2019

(65) Prior Publication Data

US 2020/0127711 A1   Apr. 23, 2020

Related U.S. Application Data

(63) Continuation of application No. 16/065,091, filed as application No. PCT/KR2017/003571 on Mar. 31, 2017, now Pat. No. 10,567,045.

(Continued)

(51) Int. Cl.
*H04B 7/0417* (2017.01)
*H04L 5/00* (2006.01)
(Continued)

(52) U.S. Cl.
CPC .......... *H04B 7/0417* (2013.01); *H04B 7/0456* (2013.01); *H04B 7/0478* (2013.01);
(Continued)

(58) Field of Classification Search
CPC ............... H04B 7/0417; H04B 7/0456; H04B 7/00626; H04B 7/0478; H04L 5/0053; H04L 5/0057; H04L 5/005; H04L 5/0023
See application file for complete search history.

(56) References Cited

U.S. PATENT DOCUMENTS 10,020,857 B2   7/2018   Wernersson et al.
10,256,886 B2*  4/2019   Kakishima ........... H04B 7/0413
(Continued)

FOREIGN PATENT DOCUMENTS

JP   2011512062   4/2011
KR  1020120033283  4/2012
(Continued)

OTHER PUBLICATIONS

U.S. Appl. No. 16/065,091, Notice of Allowance dated Jun. 24, 2019, 19 pages.
(Continued)

*Primary Examiner* — Brenda H Pham
(74) *Attorney, Agent, or Firm* — Lee, Hong, Degerman, Kang & Waimey PC

(57) ABSTRACT

The present invention provides a method for reporting channel status information (CSI) for downlink transmission to an eNode B (eNB) by a user equipment (UE) in a wireless communication system. Specifically, the method comprises the steps of: receiving a channel status information-reference signal (CSI-RS) from the eNB; calculating the CSI on the basis of the CSI-RS under the assumption that a dual-precoder including a first precoder and a second precoder is applied; and reporting the CSI to the eNB, wherein the step of calculating the CSI includes a step for assuming that at least one of the first precoder and the second precoder is cyclically employed from a predetermined precoder candidate set on the basis of a predetermined resource unit; and information associated with the at least one precoder and information associated with the predetermined precoder candidate set are provided from the eNB through radio resource control (RRC) layer signaling.

10 Claims, 8 Drawing Sheets

Related U.S. Application Data

(60) Provisional application No. 62/316,549, filed on Mar. 31, 2016, provisional application No. 62/317,448, filed on Apr. 1, 2016, provisional application No. 62/347,596, filed on Jun. 8, 2016, provisional application No. 62/369,757, filed on Aug. 2, 2016, provisional application No. 62/397,898, filed on Sep. 21, 2016, provisional application No. 62/401,866, filed on Sep. 29, 2016.

(51) Int. Cl.
*H04B 7/0456* (2017.01)
*H04B 7/06* (2006.01)

(52) U.S. Cl.
CPC .......... *H04B 7/0626* (2013.01); *H04L 5/005* (2013.01); *H04L 5/0023* (2013.01); *H04L 5/0053* (2013.01); *H04L 5/0057* (2013.01)

(56) References Cited

U.S. PATENT DOCUMENTS

| | | | |
|---|---|---|---|
| 10,567,045 B2 * | 2/2020 | Kim | H04L 5/005 |
| 2013/0343299 A1 | 12/2013 | Sayana et al. | |
| 2015/0163781 A1 | 6/2015 | Kim et al. | |
| 2015/0236773 A1 | 8/2015 | Kim et al. | |
| 2016/0156401 A1 * | 6/2016 | Onggosanusi | H04B 7/0645 370/329 |
| 2018/0115357 A1 | 4/2018 | Park et al. | |
| 2019/0007107 A1 | 1/2019 | Kim et al. | |

FOREIGN PATENT DOCUMENTS

| | | |
|---|---|---|
| KR | 1020150041024 | 4/2015 |
| KR | 101571282 | 11/2015 |
| KR | 1020150123348 | 11/2015 |
| KR | 1020160003201 | 1/2016 |
| WO | 2016043549 | 3/2016 |

OTHER PUBLICATIONS

Itri, "Discussion of CSI reporting based on non-precoded CSI-RS", 3GPP TSG RAN WG1 Meeting #81, R1-152944, May 2015, 3 pages.
Samsung, "Clarifications on non-PMI based CSI reporting", 3GPP TSG RAN WG1 Meeting #84, R1-160529, Feb. 2016, 5 pages.
Qualcomm, "Codebook design for Class A CSI reporting", 3GPP TSG RAN WG1 Meeting #82bis, R1-155739, Oct. 2015, 7 pages.
PCT International Application No. PCT/KR2017/003571, Written Opinion of the International Searching Authority dated Aug. 10, 2017, 10 pages.

* cited by examiner

FIG. 2
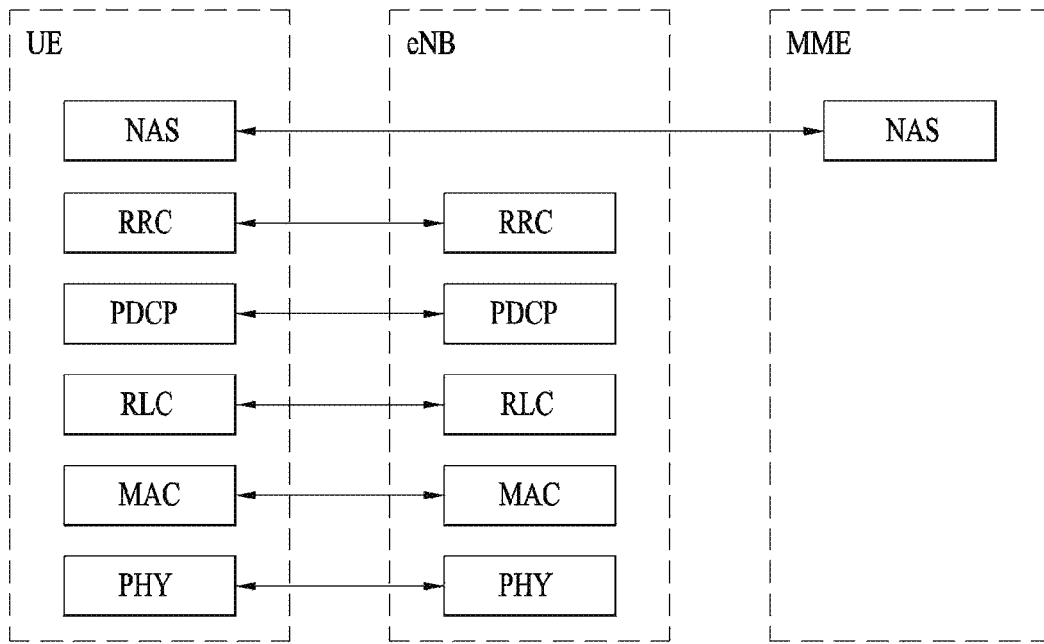
(A) CONTROL-PLANE PROTOCOL STACK
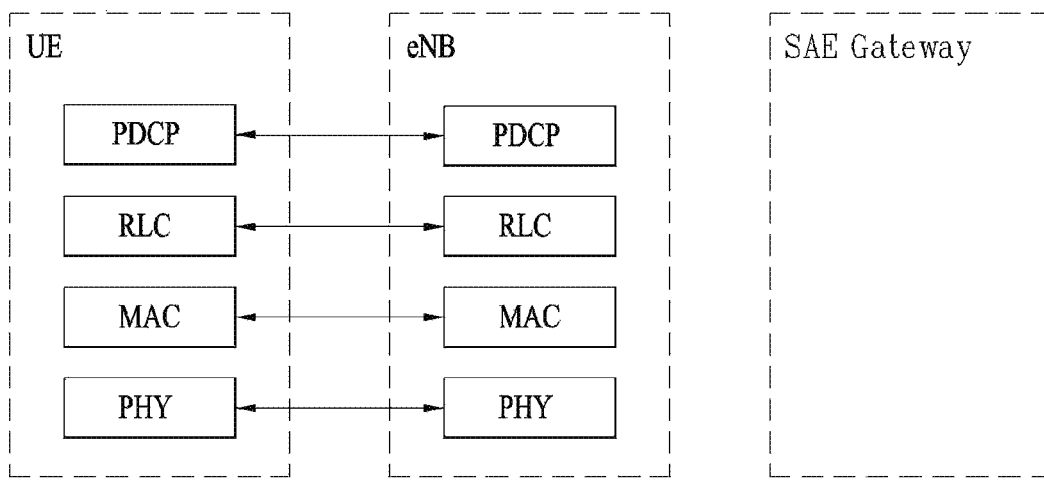
(B) USER-PLANE PROTOCOL STACK ic Specification Group Radio Access Network".
METHOD FOR TRANSMITTING FEEDBACK INFORMATION FOR DM-RS BASED OPEN-LOOP DOWNLINK TRANSMISSION IN WIRELESS COMMUNICATION SYSTEM, AND APPARATUS THEREFOR

CROSS-REFERENCE TO RELATED APPLICATIONS

This application is a continuation of U.S. patent application No. 16/065,091, filed on Aug. 1, 2018, now U.S. Pat. No. 10,567,045, which is the National Stage filing under 35 U.S.C. 371 of International Application No. PCT/KR2017/003571, filed on Mar. 31, 2017, which claims the benefit of U.S. Provisional Application Nos. 62/316,549, filed on Mar. 31, 2016, 62/317,448, filed on Apr. 1, 2016, 62/347,596, filed on Jun. 8, 2016, 62/369,757, filed on Aug. 2, 2016, 62/397,898, filed on Sep. 21, 2016 and 62/401,866, filed on Sep. 29, 2016, the contents of which are all hereby incorporated by reference herein in their entirety.

TECHNICAL FIELD

The present invention relates to a wireless communication system, and more particularly, to a method of transmitting feedback information for DM-RS based open-loop downlink transmission in a wireless communication system and apparatus therefor.

BACKGROUND ART

As an example of a mobile communication system to which the present invention is applicable, a 3rd generation partnership project long term evolution (hereinafter, referred to as LTE) communication system is described in brief FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARM)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of transmitting feedback information for DM-RS based open-loop downlink transmission in a wireless communication system and apparatus therefor.

Technical Solutions

In one technical aspect of the present invention, provided herein is a method of reporting Channel Status Information (CSI) for a downlink transmission to a base station by a user equipment in a wireless access system, the method including receiving a Channel Status Information-Reference Signal (CSI-RS) from the base station, calculating the CSI based on the CSI-RS on the assumption that a dual precoder including a first precoder and a second precoder is applied, and reporting the CSI to the base station, wherein the calculating the CSI comprises assuming that at least one precoder selected from the group consisting of the first precoder and the second precoder is cyclically applied within a prescribed precoder candidate set in a preset resource unit and wherein information on the at least one precoder and information on the prescribed precoder candidate set are provided from the base station through Radio Resource Control (RRC) layer signaling.

In another technical aspect of the present invention, provided herein is a user equipment in a wireless communication system, the user equipment including a wireless communication module and a processor connected to the wireless communication module, the processor configured to calculate Channel Status Information (CSI) based on a Channel Status Information-Reference Signal (CSI-RS) on the assumption that a dual precoder including a first precoder and a second precoder is applied based on the CSI-RS received from a base station and report the CSI to the base station, wherein the processor assumes that at least one precoder selected from the group consisting of the first precoder and the second precoder is cyclically applied within a prescribed precoder candidate set in a preset resource unit and wherein information on the at least one precoder and information on the prescribed precoder candidate set are provided from the base station through Radio Resource Control (RRC) layer signaling.

In some implementations, the information on the prescribed precoder candidate set includes information on phase rotation values in the second precoder.

Moreover, the preset resource unit is determined based on a size of a resource allocated for the downlink transmission and provided from the base station through the RRC layer signaling. Preferably, if the size of the resource allocated for the downlink transmission is equal to or greater than a threshold, the preset resource unit is at least one resource block unit. If the size of the resource allocated for the downlink transmission is smaller than the threshold, the preset resource unit is at least one resource element unit.

Preferably, information on the at least one precoder configuring the CSI may be received through the RRC layer signaling.

Advantageous Effects

According to an embodiment of the present invention, a user equipment can report feedback information for DM-RS based open-loop downlink transmission in a wireless communication system more efficiently.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE FOR INVENTION

Figure 1:
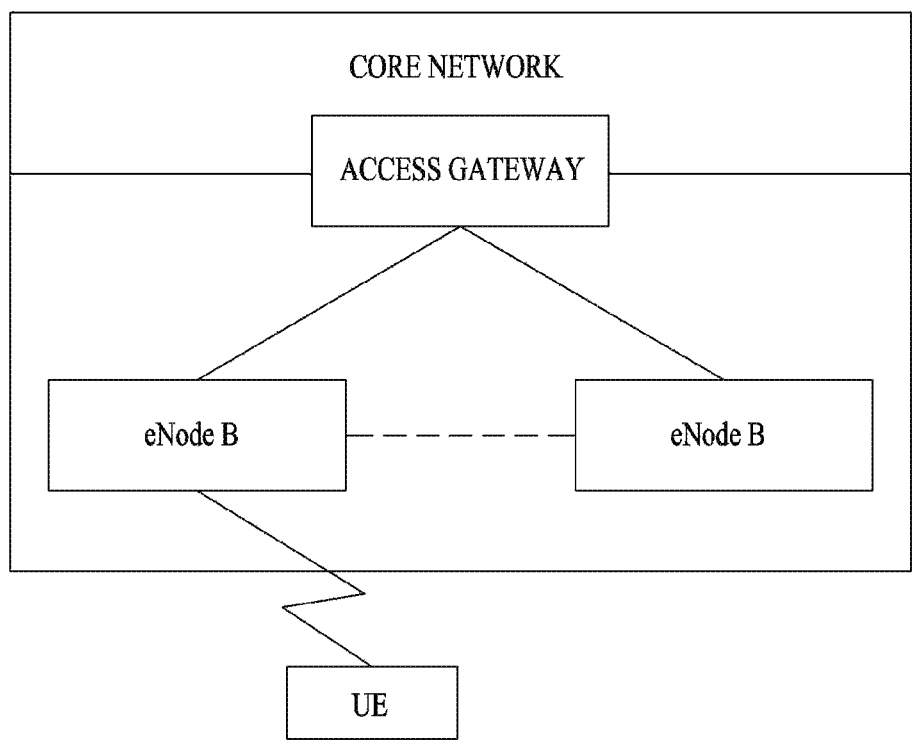
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
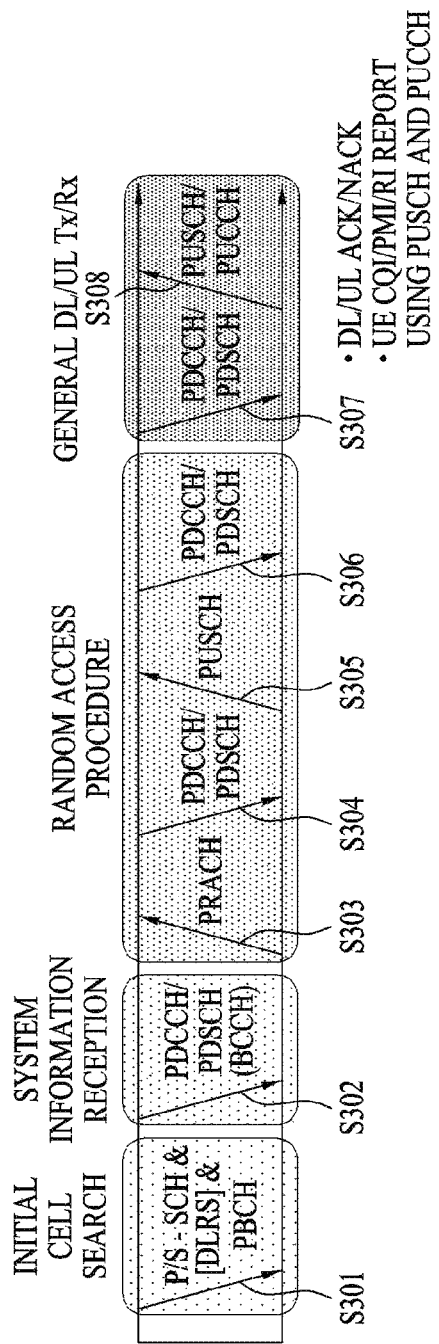
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PM/RI through a PUSCH and/or a PUCCH.

Figure 4:
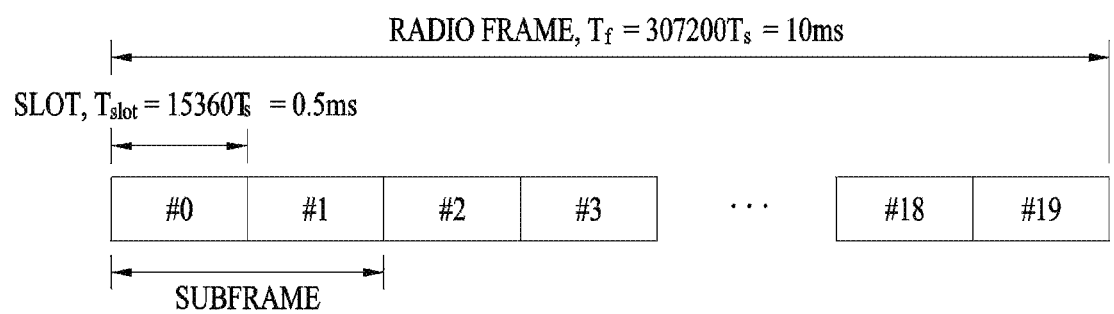
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers ×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
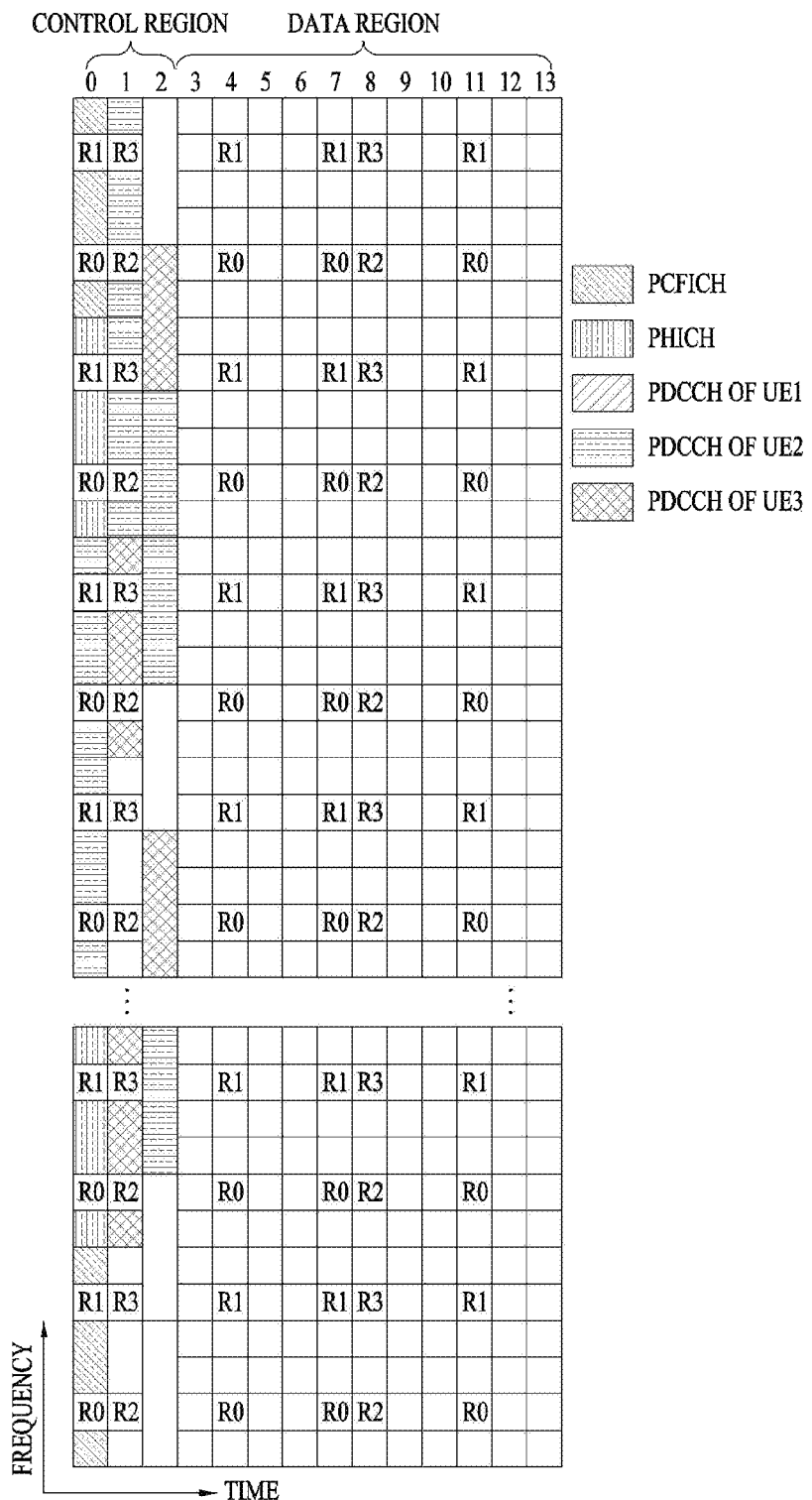
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration.

In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
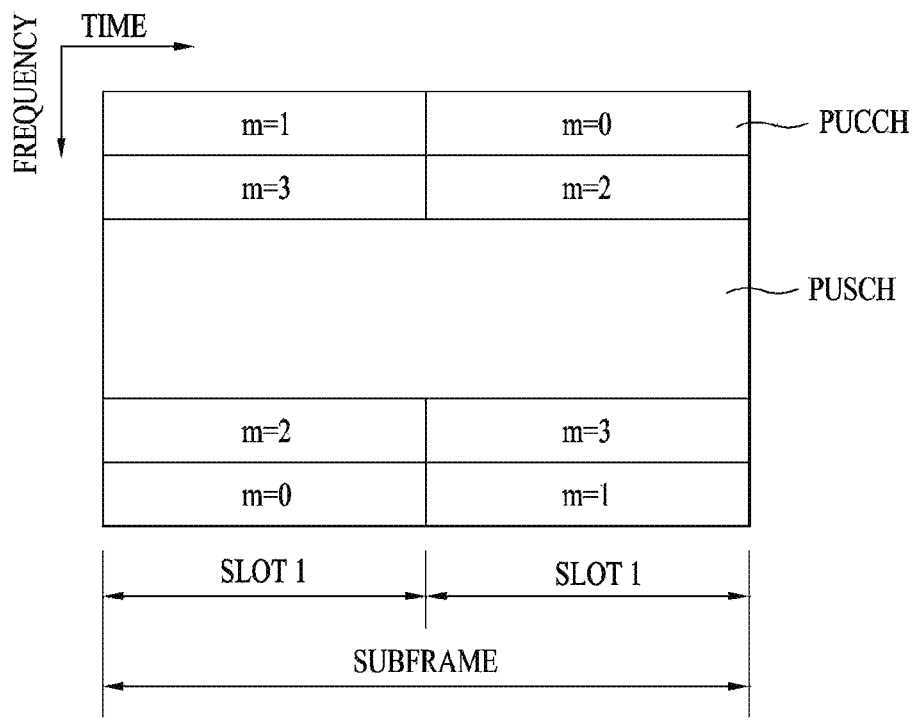
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
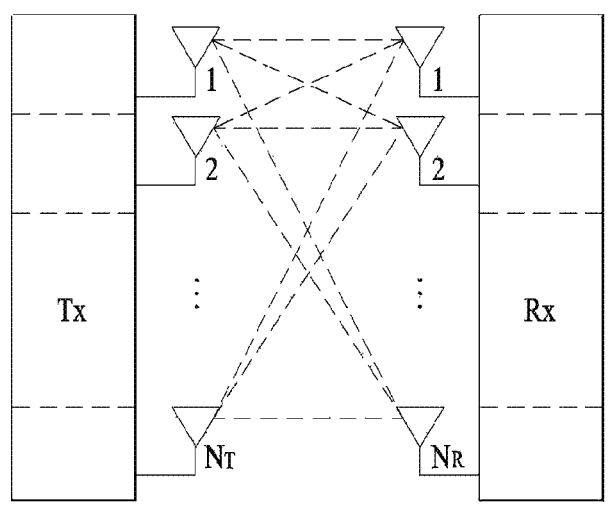
FIG. 7 is a diagram illustrating a configuration of a general MIMO communication system.

FIG. 7 illustrates the configuration of a typical MIMO communication system.

A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_N T$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \hat{W}s = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

A DM-RS which is a dedicated reference signal is supported for PDSCH transmission and is transmitted on antenna port(s) p=5, p='7, p=8, . . . , υ+6 (where, υ is the number of layers used for PDSCH transmission). The DM-RS exists when PDSCH transmission is associated with the antenna port and is a valid reference only for PDSCH demodulation. The DM-RS is transmitted only on RBs to which the PDSCHs are mapped.

That is, the DM-RS is configured to be transmitted only on RBs, to which the PDSCHs are mapped, in a subframe in which the PDSCHs are scheduled, unlike a CRS configured to be transmitted in every subframe regardless of presence/absence of the PDSCH. In addition, the DM-RS is transmitted only via antenna port(s) corresponding to layer(s) of the PDSCHs, unlike the CRS transmitted via all antenna port(s) regardless of the number of layers of the PDSCHs. Accordingly, overhead of the RS may be reduced as compared to the CRS.

Hereinafter, channel state information (CSI) report will be described. In the current LTE standard, two transmission schemes, i.e., an open-loop MIMO scheme operating without channel information and a closed-loop MIMO scheme based on channel information exist. In particular, in the closed-loop MIMO scheme, in order to obtain multiplexing gain of a MIMO antenna, an eNB and a UE may perform beamforming based on channel state information. The eNB transmits a reference signal to the UE and instructs the UE to feed back the channel state information measured based thereon via a physical uplink control channel (PUCCH) or a physical uplink shared channel (PUSCH), in order to obtain the channel state information from the UE.

The CSI is roughly divided into a rank indicator (RI), a precoding matrix index (PMI) and a channel quality indicator (CQI). First, the RI indicates the rank information of a channel as described above and means the number of streams which may be received by the UE via the same time-frequency resources. In addition, the RI is determined by long term fading of the channel and thus is fed back to the eNB at a period longer than that of the PMI or CQI. Second, the PMI has a channel space property and indicates a precoding index of the eNB preferred by the UE based on a metric such a signal to interference plus noise ratio (SINR). Lastly, the CQI indicates the intensity of the channel and means a reception SINR obtained when the eNB uses the PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\,W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

$$W2(j) = \begin{bmatrix} \overbrace{e_M^k \quad e_M^l \quad \cdots \quad e_M^m}^{r \text{ columns}} \\ \alpha_j e_M^k \quad \beta_j e_M^l \quad \gamma_j e_M^m \end{bmatrix} \text{ (if rank} = r\text{)},$$

where $1 \leq k, l, m \leq M$ and $k, l, m$ are integer.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
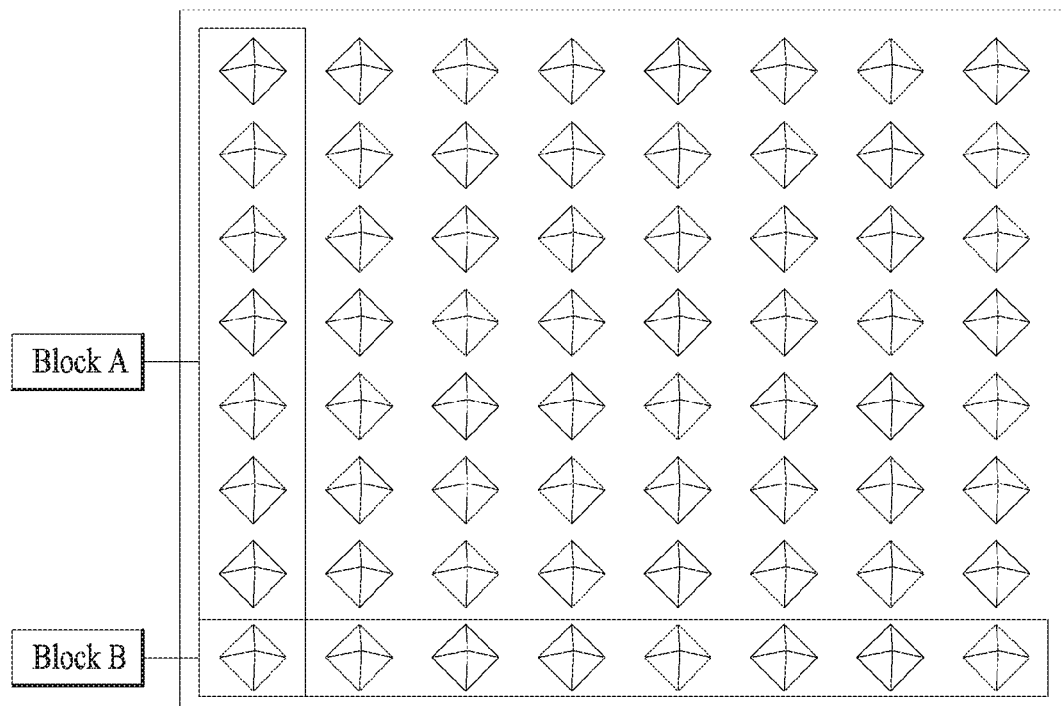
FIG. 8 illustrates an example of implementation of the 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is established by mounting a large number of antennas in vertical and horizontal directions.

In a 2D-AAS applied FD (full dimension), a base station can configure several CSI-RS resources for a UE in a single CSI process. Here, the CSI process means an operation of feeding back channel information with an independent feedback configuration.

In this case, the UE does not consider a CSI-RS resource configured within a single CSI process as an independent channel, assumes a single huge CSI-RS resource by aggregating the corresponding CSI-RS resources, and calculates & feeds back CSI based on the huge CSI-RS resource. For example, the base station configures three 4-port CSI-RS resources within a signal CSI process for the UE, and the UE assumes a single 12-port CSI-RS resource by aggregating the three 4-port CSI-RS resources. The UE calculates and feeds back CSI using 12-port PMI based on this CSI-RS resource. Such a reporting mode is referred to as Class A CSI reporting in the LTE-A system.

Or, the UE assumes each of the CSI-RS resources as an independent channel, selects one of the CSI-RS resources, and then calculates & reports CSI on the basis of the selected resource. Namely, the UE selects a CSI-RS of a strong channel from the 8 CSI-RS resources, calculates CSI on the basis of the selected CSI-RS, and reports the CSI to the base station. In doing so, the UE additionally reports the selected CSI-RS to the base station via CRI (CSI-RS resource indicator). For example, if a channel of the first CSI-RS corresponding to T(0) is the strongest, the UE sets CRI=0 and then reports it to the base station. Such a reporting mode is referred to as Class B CSI reporting in the LTE-A system.

In order to effectively show the aforementioned characteristic, variables described in the following can be defined for a CSI process in Class B. K means the number of CSI-RS resources existing in the CSI process. Nk means the number of CSI-RS ports of a $k^{th}$ CSI-RS resource.

Prior to describing the present invention, LD-CDD scheme of the current LTE system is examined. Currently, LD-CDD scheme is defined in the LTE system as Equation 11.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 11]}$$

In Equation 11, $x(i)=[x^{(0)}(i) \ldots x^{(v-1)}(i)]^T$ is a data symbol vector to which precoding is not applied. $y(i)=[y^{(0)}(i) \ldots y^{(P-1)}(i)]^T$ is a Tx signal vector to which precoding is applied. Moreover, V and P mean the number of Tx layers and the number of antenna ports, respectively. In Equation 11, W(i) means a precoding matrix for adjusting a channel. Hence, to work to a change of a channel, an appropriate codeword can be selected from a codebook and then used.

Yet, according to the LD-CDD scheme of the current LTE system, a codeword is not selected and used in accordance with a channel situation. W(i) used in the LTE system is expressed as Equation 12.

$$\begin{cases} W(i) = C_1 & \text{for 2 antenna ports} \\ W(i) = C_k, \quad k = \left(\left\lfloor \frac{i}{v} \right\rfloor \mod 4\right) + 1 \in \{1, 2, 3, 4\} & \text{for 4 antenna ports} \end{cases} \quad \text{[Equation 12]}$$

In Equation 12, $C_k$ means a codeword. Hence, as a fixed value or a value having a predetermined pattern, W(i) copes with a changing channel.

On the other hand, D(i) and U in Equation 11 play a role in distributing signals of a layer domain to all virtual antennas at the same rate by mixing all Tx layers in a domain. Hence, layers have the same channel quality. Thus, layers are averaged, thereby playing a great role in reducing signal overhead. For example, when a receiving end uses a linear MMSE (minimum mean square error) scheme, it is enough to feed back a single CQI only. And, individual HARQ retransmissions are not necessary for different layers. Therefore, downlink control signaling can be reduced. D(i) and U used in the current LTE system are defined as Table 1.

TABLE 1

| Number of layers v | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

The aforementioned LD-CDD system shall be further generalized as follows. In Equation 11, W(i) is defined as a precoder related to a channel, U is generalized into a unitary matrix, and D(i) is generalized into a diagonal matrix in which diagonal terms have a phase difference in the same size like Equation 13.

$$D(i) = \begin{bmatrix} 1 & 0 & \cdots & 0 \\ 0 & e^{j\theta_{1,i}} & \cdots & 0 \\ \vdots & \vdots & \ddots & 0 \\ 0 & 0 & 0 & e^{j\theta_{v-1,i}} \end{bmatrix} \quad \text{[Equation 13]}$$

Looking into Equation 13, it can be observed that D(i) performs a phase shift according to a frequency. If the generalized W(i), D(i) and U are applied to Equation 11, beamforming is performed in a manner that all layers change according to a frequency by D(i) and U. Particularly, a covariance matrix of a tx vector y can be calculated as Equation 14.

$$R_{yy}^{(i)} = E[y(i)(y(i))^H] = W(i)D(i)UU^H(D(i))^H(W(i))^H = W(i)(W(i))^H \quad \text{[Equation 14]}$$

Assuming that W(i) is used as a precoder intending to raise a channel gain using a high eigenvalue of a channel to the maximum, since D(i) and U do not change a covariance matrix of a Tx vector in Equation 14, it can be observed that D(i) and U concentrate on averaging a total layer channel quality by preserving such a channel gain.

As described above, when a base station establishes 2D-AAS, an antenna in a vertical direction is installed as well. According to the legacy LD-CDD scheme, a diversity gain is obtained by changing beams in a horizontal direction alternately. Hence, in order to obtain a more diversity gain, a 2D-AAS base station preferably changes a beam in a vertical direction as well. Therefore, an LD-CDD scheme of changing a beam in a vertical direction together has been proposed recently.

Yet, the LD-CDD scheme of changing a beam in a vertical direction together has a problem. Basically, according to the LD-CDD scheme of the current LTE system, a base station and a UE are aware of the precoder like Equation 8 in advance. The base station informs the UE of a channel from horizontal antenna ports to the UE through CRS for the horizontal antenna port, and the UE becomes aware of a final channel by applying the precoder to the channel obtained through the CRS. Here, if the 2D-AAS installed base station uses the precoder for a vertical beam by changing it, CRS ports may be required as many as the total number of antenna ports of the base station. Yet, since CRS is currently defined as 4 antenna ports, a DM-RS based LD-CDD scheme is proposed. According to the current LTE standard, LD-CDD transmission is possible up to 8 layers using DM-RS.

<DM-RS Based DL Transmission Scheme>

As DM-RS based DL transmission schemes, transmission schemes 1) to 6) are proposed as follows.

Transmission Scheme 1)

$$\begin{bmatrix} y^{(7)}(i) \\ \vdots \\ y^{(7+(P\_DMRS-1))}(i) \end{bmatrix} = D(i)U \begin{bmatrix} x^{(0)}(i) \\ \vdots \\ x^{(v-1)}(i) \end{bmatrix} \quad \text{[Equation 15]}$$

$$\begin{bmatrix} y^{(15)}(i) \\ \vdots \\ y^{(15+(P\_CSIRS-1))}(i) \end{bmatrix} = W(n_{RB}) \begin{bmatrix} r^{(7)}(i) \\ \vdots \\ r^{(7+(v-1))}(i) \end{bmatrix} \quad \text{[Equation 16]}$$

In Equation 15, $x(i)=[x^{(0)}(i) \ldots x^{(v-1)}(i)]^T$ and $y(j)=[y^{(0)}(j) \ldots y^{7+(P\_DMRS-1)}(j)]^T$ mean a data symbol vector and a DM-RS port, respectively. v and P_DMRS mean the number of Tx layers and the number of DM-RS ports, respectively. v and P_DMRS are equal to each other. Data x is precoded by DU and then transmitted through DM-RS port 7 to port 7+(p_DM-RS-1).

U is a DFT matrix in v-by-v size. D(i) is an element (k,k) and has a value of $e^{-j2pi/v*(i*k)}$ (where, k={0, 1, ..., v-1}). Eventually, D and U are the values simply extended from D and U used by the legacy LD-CDD.

In Equation 16, $r(j)=[r^{(7)}(j) \ldots r^{7+(v-1)}(j)]^T$ and $y(j)=[y^{(15)}(j) \ldots y^{15+(P\_CSIRS-1)}(j)]^T$ mean Walsh spreading applied DM-RS sequence and CSI-RS antenna port, respectively. Namely, $r^{(n)}(j)$ is a DM-RS sequence corresponding to a DM-RS port n and is in a Walsh spreading applied state. v and P_CSIRS mean the number of Tx layers and the number of CSI-RS antenna ports, respectively. DM-RS sequence r is precoded by W and then transmitted through CSI-RS port 15 to port 15+(p_CSI-RS–1).

In Equation 16, W is a precoding matrix having a size of p_CSI-RS by v and can be changed in an RB unit that is the smallest. If PRB bundling is applied, W can be changed in a bundled RB unit. Or, a base station can inform a UE of a unit of a resource for changing W. Moreover, like the legacy LD CDD scheme, W can be changed into one value in a restricted codeword set (e.g., {c1, c2, c3 . . . ck}). As $n_{RB}$ increases, W can be changed in a manner of circularly rotating from c1 to ck sequentially. The base station can inform the UE of the restricted codeword set through RRC signaling.

As a codebook over 4 ports is defined as a dual codeword structure, W can be expressed as W1*W2. W may be changed by changing both a codeword index of W1 and a codeword index of W2, by fixing a codeword index of W1 and changing a codeword index of W2, or by fixing a codeword index of W2 and changing a codeword index of W1. How to make a codeword set of W using one of the three ways can be RRC-signaled to the UE by the base station.

DM-RS is the structure transmitted in a manner of having the same beam applied in an RB unit. If PRB bundling is applied, DM-RS is a structure transmitted in a manner of having the same beam applied in a bundled RB unit. As a result, in Equation 16, W can be changed in an RB unit that is the smallest. On the other hand, according to the legacy LD CDD scheme, W can be changed in v RE units corresponding to the number of layers. As a result, Transmission scheme 1 has a limited diversity effect obtained from beam cycling in comparison with the legacy LD CDD scheme.

Transmission Scheme 2)

$$\begin{bmatrix} y^{(7)}(i) \\ \vdots \\ y^{(7+(P\_DMRS-1))}(i) \end{bmatrix} = P(i) \begin{bmatrix} x^{(0)}(i) \\ \vdots \\ x^{(v-1)}(i) \end{bmatrix} \quad [\text{Equation 17}]$$

$$\begin{bmatrix} y^{(15)}(i) \\ \vdots \\ y^{(15+(P\_CSIRS-1))}(i) \end{bmatrix} = W(n_{RB})D(0)U \begin{bmatrix} r^{(7)}(i) \\ \vdots \\ r^{(7-(v-1))}(i) \end{bmatrix} \quad [\text{Equation 18}]$$

In Equation 17, $x(i)=[x^{(0)}(i) \ldots x^{(v-1)}(i)]^T$ and $y(j)=[y^{(15)}(j) \ldots y^{15+(P\_CSIRS-1)}(j)]^T$ mean a data symbol vector and a DM-RS port, respectively. v and P_DIMS mean the number of Tx layers and the number of DM-RS ports, respectively. v and P_DINS are equal to each other. Data x is layer-permutated by a permutation matrix P and then transmitted through DM-RS port 7 to port 7+(p_DM-RS–1). P(0) is defined as an identity matrix in v-by-b size, and P(i) is generated by circularly rotating a row vector position of P(0). For example, if v=3, P can be defined as Equation 19.

$$P(i) = \begin{cases} \begin{bmatrix} 1 & 0 & 0 \\ 0 & 1 & 0 \\ 0 & 0 & 1 \end{bmatrix}, \text{ when } i \% 3 = 0 \\ \begin{bmatrix} 0 & 1 & 0 \\ 0 & 0 & 1 \\ 1 & 0 & 0 \end{bmatrix}, \text{ when } i \% 3 = 1 \\ \begin{bmatrix} 0 & 0 & 1 \\ 1 & 0 & 0 \\ 0 & 1 & 0 \end{bmatrix}, \text{ when } i \% 3 = 2 \end{cases} \quad [\text{Equation 19}]$$

In Equation 18, $r(j)=[r^{(7)}(j) \ldots r^{7+(v-1)}(j)]^T$ and $y(j)=[y^{(0)}(j) \ldots y^{7+(P\_DMRS-1)}(j)]^T$ mean a Walsh spreading applied DM-RS sequence and a CSI-RS antenna port, respectively. Namely, $r_{(n)}(j)$ is a DM-RS sequence corresponding to a DM-RS port n and is in a Walsh spreading applied state. v and P_CSIRS mean the number of Tx layers and the number of CSI-RS antenna ports, respectively. A DM-RS sequence r is precoded by WD(0)U and then transmitted through CSI-RS port 15 to port 15+(p_CSI-RS–1).

U is a DFT matrix in v-by-v size. D(i) is an element (k,k) and has a value of $e^{-j2pi/v*(i*k)}$ (where, k={0, 1, . . . , v–1}). Eventually, D and U are the values simply extended from D and U used by the legacy LD-CDD.

In Equation 18, W is a precoding matrix having a size of p_CSI-RS by v and can be changed in an RB unit that is the smallest. If PRB bundling is applied, W can be changed in a bundled RB unit. Or, a base station can inform a UE of a unit of a resource for changing W. Moreover, like the legacy LD CDD scheme, W can be changed into one value in a restricted codeword set (e.g., {c1, c2, c3 . . . , ck}). As $n_{RB}$ increases, W can be changed in a manner of circularly rotating from c1 to ck in sequence. The base station can inform the UE of the restricted codeword set through RRC signaling.

As a codebook over 4 ports is defined as a dual codeword structure, W can be expressed as W1*W2. W may be changed by changing both a codeword index of W1 and a codeword index of W2 in a manner of cycling them, by fixing a codeword index of W1 or fixing it to a feedback value and changing a codeword index of W2 in a manner of cycling it, or by fixing a codeword index of W2 or fixing it to a feedback value and changing a codeword index of W1 in a manner of cycling it. How to make a codeword set of W using one of the three ways can be RRC-signaled to the UE by the base station.

DM-RS is the structure transmitted in a manner of having the same beam applied in an RB unit. If PRB bundling is applied, DM-RS is a structure transmitted in a manner of having the same beam applied in a bundled RB unit. As a result, in Equation 18, W can be changed in an RB unit that is the smallest. On the other hand, according to the legacy LD CDD scheme, W can be changed in unit of v REs corresponding to the number of Tx layers. As a result, Transmission scheme 2 also has a limited diversity effect obtained from beam cycling in comparison with the legacy LD CDD scheme.

Simply, both D and U in Equation 18 can be configured by being substituted with identity matrix. In this case, the same performance can be obtained. In addition, a layer permutation function may not be used by setting P in Equation 17 to an identity matrix all the time. A base station may determine whether to use the layer permutation function commonly and then inform a UE of the determination. And, in a random transmission scheme as well as Transmission scheme 2, the base station can activate or deactivate layer permutation using such signaling.

Transmission Scheme 3)

$$\begin{bmatrix} y^{(7)}(i) \\ \vdots \\ y^{(7+(P\_DMRS-1))}(i) \end{bmatrix} = W(i)D(i)U \begin{bmatrix} x^{(0)}(i) \\ \vdots \\ x^{(v-1)}(i) \end{bmatrix} \quad \text{[Equation 20]}$$

$$\begin{bmatrix} y^{(15)}(i) \\ \vdots \\ y^{(15+(P\_CSIRS-1))}(i) \end{bmatrix} = \begin{bmatrix} r^{(7)}(i) \\ \vdots \\ r^{(7+(P\_DMRS-1))}(i) \end{bmatrix} \quad \text{[Equation 21]}$$

In Equation 20, $x(i)=[x^{(0)}(i) \ldots x^{(v-1)}(i)]^T$ and $y(j)=[y^{(0)}(j) \ldots y^{7+(P\_DMRS-1)}(j)]^T$ mean a data symbol vector and a DM-RS port, respectively. v and P_DMRS mean the number of Tx layers and the number of DM-RS ports, respectively. v and P_DMRS are equal to each other. Data x is precoded by DU and then transmitted through DM-RS port 7 to port 7+(p_DM-RS-1).

U is a DFT matrix in v-by-v size. D(i) is an element (k,k) and has a value of $e^{-j2pi/v*(i*k)}$ (where, $k=\{0, 1, \ldots, v-1\}$). Eventually, D and U are the values simply extended from D and U used by the legacy LD-CDD.

In Equation 20, W is a precoding matrix having a size of p_CSI-RS by v and can be changed in an RB unit that is the smallest. Or, a base station can inform a UE of a unit of a resource for changing W. Moreover, like the legacy LD CDD scheme, W can be changed into one value in a restricted codeword set (e.g., {c1, c2, c3 ... ck}). As i increases, W can be changed in a manner of circularly rotating from c1 to ck in sequence. The base station can inform the UE of the restricted codeword set through RRC signaling.

As a codebook over 4 ports is defined as a dual codeword structure, W can be expressed as W1*W2. W may be changed by changing both a codeword index i1 of W1 and a codeword index of W2, by fixing a codeword index i1 of W1 and changing a codeword index of W2, or by fixing a codeword index i2 of W2 and changing a codeword index of W1. How to make a codeword set of W using one of the three ways can be RRC-signaled to the UE by the base station.

In Equation 21, $r(j)=[r^{(7)}(j) \ldots r^{7+(v-1)}(j)]^T$ and $y(j)=[y^{(15)}(j) \ldots y^{15+(P\_CSIRS-1)}(j)]^T$ mean Walsh spreading applied DM-RS sequence and CSI-RS antenna port, respectively. Namely, $r^{(n)}(j)$ is a DM-RS sequence corresponding to a DM-RS port n and is in a Walsh spreading applied state. P_DMRS and P_CSIRS mean the number of DM-RS ports and the number of CSI-RS antenna ports, respectively. A DM-RS sequence r is 1:1 mapped and transmitted through CSI-RS port 15 to port 15+(p_CSI-RS-1). P_DMRS and P_CSIRS are equal to each other.

In Transmission scheme 3), unlike Transmission scheme 1) and Transmission scheme 2), beam cycling by w is applied between a data x and a DM-RS port y. According to the beam cycling, when a candidate of W is defined as a specific set, a value of W is determined in a manner of sequential circular rotation of a specific element in the set according to a frequency-time resource for transmitting data. Hence, although demodulation is performed with DM-RS, W can be changed in unit of v REs corresponding to the number of Tx layers like the legacy LD CCD scheme. As a result, in comparison with Transmission scheme 1) or Transmission scheme 2), Transmission scheme 3 has the great diversity effects obtained from the beam cycling.

In Transmission scheme 1) and Transmission scheme 2), the number of data layers is equal to the number of DM-RS ports. Yet, in Transmission scheme 3, the number of DM-RS ports is equal to the number of CSI-RS ports. For example, in case of using 8-port CSI-RS, 8-port DM-RS is configured for a UE. Hence, Transmission scheme 3) has the number of DM-RS ports, which is greater than that of Transmission scheme 1) or Transmission scheme 2). As a result, DM-RS overhead increases, thereby reducing transmission power per DM-RS port.

If a UE performs feedback on W and a base station performs beam cycling using the fed-back W [i.e., semi-open-loop based transmission scheme], e.g., if beam cycling for a final W is performed by using a fed-back value for W1 and applying a predetermined beam cycling to W2 in a dual codebook structure, the base station should inform the UE of W information applied to the data transmission through DCI according to Transmission scheme 3). Hence, in the above example, W1 is indicated through DCI and a beam cycling scheme previously determined without signaling is applied to W2.

Moreover, since the number of DM-RS ports may be different from the number of Tx layers, the base station should inform the UE of the number of Tx layers through DCI together with DM-RS port.

In case that the mapping between data and DM-RS port depends on W like Transmission scheme 3) or Transmission scheme 4) mentioned later, i.e., when W is applied to data and the data is transmitted through DM-RS port, if the UE feeds back partial information of W in form of a semi-open loop, the base station should indicate whether precoding was performed by applying the information in case of data transmission (through DCI). If not applying the information, the base station should indicate that precoding was performed by applying a prescribed value substituted for the information (through DCI). Or, without separate signaling, the base station and the UE agree that data is precoded by applying the latest information or the most recent information in partial information of W previously fed back by the UE in a subframe #(n-m) on the assumption that a data transmission timing is a subframe #n. Here, m can be RRC-signaled to the UE by the base station or fixed to a specific value.

Transmission Scheme 4)

$$\begin{bmatrix} y^{(7)}(i) \\ \vdots \\ y^{(7+(P\_DMRS-1))}(i) \end{bmatrix} = W_{Data}(i)D(i)U \begin{bmatrix} x^{(0)}(i) \\ \vdots \\ x^{(v-1)}(i) \end{bmatrix} \quad \text{[Equation 22]}$$

$$\begin{bmatrix} y^{(15)}(i) \\ \vdots \\ y^{(15+(P\_CSIRS-1))}(i) \end{bmatrix} = W_{DMRS}(n_{RB}) \begin{bmatrix} r^{(7)}(i) \\ \vdots \\ r^{(7+(P\_DMRS-1))}(i) \end{bmatrix} \quad \text{[Equation 23]}$$

In Transmission scheme 4, in order to alleviate the aforementioned disadvantage of Transmission scheme 3, W(i) in Transmission scheme 3 is defined in a manner of being divided into a precoder $W_{DM-RS}$ applied between DM-RS port and CSI-RS port and a precoder $W_{Data}$ applied between data and DM-RS port. $W_{DM-RS}$ is a matrix in size of P_CSI-RS by P_DM-RS, and satisfies P_CSI-RS>P_DM- RS>=v. As a result, the number of DM-RS Tx ports in Transmission scheme 4) is reduced in comparison with Transmission scheme 3).

According to Transmission scheme 4), a wide beam having small time variation is generated in consideration of a channel and then applied to DM-RS transmission through $W_{DM-RS}$, and a narrow beam having large time variation is applied to data transmission through $W_{Data}$. So to speak, it can be understood that a diversity effect is obtained in a manner of reducing antenna dimension with an antenna having P_DM-RS ports by applying $W_{DM-RS}$ fed back by the UE to an antenna having P_CSI-RS ports and then changing $W_{Data}$ through beam cycling for the reduced antenna ports.

Moreover, according to the semi-open-loop scheme, a UE feeds $W_{DM-RS}$ back to a base station. The base station then transmits DM-RS using the corresponding value. On the other hand, $W_{Data}$ (i.e., precoder applied between data and DM-RS) is beam-cycled by a determined beam cycling without feedback. Therefore, DCI signaling for $W_{Data}$ is necessary for Transmission scheme 4).

In Transmission scheme 4), as the DM-RS port number may be different from the Tx layer number, the base station should inform the UE of the transmission layer number through DCI together with DM-RS port.

A detailed example of Transmission scheme 4) is described as follows.

Figure 9:
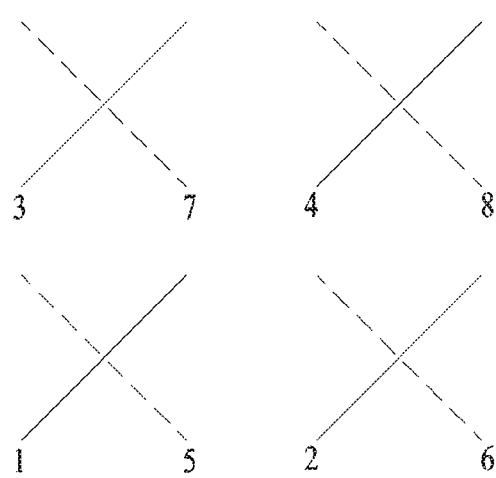
FIG. 9 shows a 2D X-pol antenna array and a corresponding 8-port CSI-RS.

FIG. 9 shows a 2D X-pol antenna array and a corresponding 8-port CSI-RS.

Transmission scheme 4) is described with reference to FIG. 9 as follows. A UE feeds back a PMI, which is to be applied to a vertical antenna, to a base station. Using this PMI, the base station determines $W_{DM-RS}$. As a result, DM-RS port 7 is transmitted through CSI-RS port 1 and CSI-RS port 3 by applying $W_{DM-RS}$. DM-RS port 8 is transmitted through CSI-RS port 2 and CSI-RS port 4 by applying $W_{DM-RS}$. DM-RS port 9 is transmitted through CSI-RS port 5 and CSI-RS port 7 by applying $W_{DM-RS}$. And, DM-RS port 10 is transmitted through CSI-RS port 6 and CSI-RS port 8 by applying $W_{DM-RS}$.

Therefore, the number of DM-RS ports is determined as 4 and the DM-RS ports have a structure of a vertical antenna array (horizontal antenna array). Moreover, a previously determined beam cycling scheme according to a frequency i is applied to W applied between data and DM-RS ports.

A UE feeds back a PMI, which is to be applied to a vertical antenna, to a base station. And, the base station determines $W_{DM-RS}$ and WData using the PMI. Such a process is described in detail as follows.

Class A codebook defined for 2D antenna array is determined as a combination of PMI (i1) of W1 and PMI (i2) of W2. And, i1 consists of a combination of i11 and i12. For example, i11 determines a DFT vector set applied to a vertical antenna and i12 determines a DFT vector set applied to a horizontal antenna. In some cases, i11 may indicate a DFT vector set of a horizontal antenna and i12 may indicate a DFT vector set of a vertical antenna. In order to determine $W_{DM-RS}$, the UE feeds back i1 to the base station, and the base station calculates i11 from i1. Or, the UE may directly feed i11 back to the base station. In doing so, the UE calculates i1 in a following manner.

Optimal i1 is calculated by changing both i11 and i12 just as it was.

If there exists a beam cycling scheme previously determined for i12, i11 is calculated in a state that a beam cycling is applied to i12. Although an optimal i11 value is found, since i12 is cycled, an index of i1 is changed. Hence, i1 is calculated with reference to the found i11 value and a first i12 value that becomes a circular rotation target.

Now, the base station discovers a DFT vector $v(=[1\ \exp(j\theta)]^T)$, which is to be applied to a vertical antenna, from i11. In this case, according to an RRC-signaled codebook configuration value, there is a case that a single vector exists in a DFT vector set corresponding to i11 or a case that two or more vectors exist therein. For example, according to codebook configuration 1 or 4, since a single vector exists in a DFT vector set corresponding to i11, v can be determined as an i11 value. On the other hand, according to codebook configuration 2 or 3, two vectors exist in a DFT vector set corresponding to i11 and a single vector is selected by i2. In this case, v is determined by the following methods.

According to a first method, a UE additionally feeds back i2 and determines v through i11 and i2 values. According to a second method, v is determined as a vector always located in a specific position among several vectors in a DFT vector set. For example, v is determined as a first vector always existing in a set. According to a third method, a UE does not expect that a base station sets a codebook configuration to 2 or 3 in an OL transmission scheme and the base station may not set the codebook configuration to 2 or 3. $W_{DM-RS}$ is calculated using v as Equation 24.

$$W_{DMRS}(n_{RB}) = \begin{bmatrix} 1 & 0 & 0 & 0 \\ 0 & 1 & 0 & 0 \\ e^{j\theta} & 0 & 0 & 0 \\ 0 & e^{j\theta} & 0 & 0 \\ 0 & 0 & 1 & 0 \\ 0 & 0 & 0 & 1 \\ 0 & 0 & e^{j\theta} & 0 \\ 0 & 0 & 0 & e^{j\theta} \end{bmatrix} \quad \text{[Equation 24]}$$

In order to determine $W_{Data}$, a general structure of codeword generated from a class A code book is described. First of all, Equation 25 shows a general structure of codeword generated from the class A codebook. In the equation, an i-column vector is configured in a manner of finding a column vector by applying Kronecker product to a DFT vector $v_i$ (in size of # of vertical antennas by 1) and a DFT vector $h_i$ (in size of # of horizontal antennas by 1), concatenating the column vector in a column direction, and then multiplying a lower column vector by a phase rotation value of $\alpha_i$. Here, $\alpha_i$ may be referred to as co-phase.

$$\begin{bmatrix} v_1 \otimes h_1 & v_2 \otimes h_2 & \ldots & v_k \otimes h_k \\ \alpha_1(v_1 \otimes h_1) & \alpha_2(v_2 \otimes h_2) & \ldots & \alpha_k(v_k \otimes h_k) \end{bmatrix} \quad \text{[Equation 25]}$$

A base station and a UE can calculate $W_{Data}$ by substituting $V_i \otimes h_i$ with $h_i$ in Equation 25. Namely, it is calculated as Equation 26.

$$W_{Data}(i) = \\ f\left(\begin{bmatrix} v_1 \otimes h_1 & v_2 \otimes h_2 & \ldots & v_k \otimes h_k \\ \alpha_1(v_1 \otimes h_1) & \alpha_2(v_2 \otimes h_2) & \ldots & \alpha_k(v_k \otimes h_k) \end{bmatrix}\right) = \\ \begin{bmatrix} h_1 & h_2 & \ldots & h_k \\ \alpha_1(h_1) & \alpha_2(h_2) & \ldots & \alpha_k(h_k) \end{bmatrix} \quad \text{[Equation 26]}$$

In order to apply a beam cycling to $W_{Data}$, a base station and a UE can change i1 and i2 according to a determined beam cycling scheme. In this case, by generating the codeword expressed in Equation 25 in a manner of fixing i11 to a fed-back value and changing i12 and i2 and substituting $V_i \otimes h_i$ with $h_i$, it is able to make $W_{Data}$ expressed in Equation 26.

Transmission scheme 5)

The following Transmission scheme 5) may be regarded as one example of the aforementioned Transmission scheme 2).

$$\begin{bmatrix} y^{(7)}(i) \\ \vdots \\ y^{(7+(P\_DMRS-1))}(i) \end{bmatrix} = P(i) \begin{bmatrix} x^{(0)}(i) \\ \vdots \\ x^{(\nu-1)}(i) \end{bmatrix}$$ [Equation 27]

$$\begin{bmatrix} y^{(15)}(i) \\ \vdots \\ y^{(15+(P\_CSIRS-1))}(i) \end{bmatrix} = W(n_{RB}) \begin{bmatrix} r^{(7)}(i) \\ \vdots \\ r^{(7+(\nu-1))}(i) \end{bmatrix}$$ [Equation 28]

In Equation 27, and $x(i)=[x^{(0)}(i) \ldots x^{(\nu-1)}(i)]^T$ and $y(j)=[y^{(0)}(j) \ldots y^{7+(P\_DMRS-1)}(j)]^T$ mean a data symbol vector and a DM-RS port, respectively. $\nu$ and P_DMRS mean the number of Tx layers and the number of DM-RS ports, respectively. $\nu$ and P_DMRS are equal to each other. Data x is layer-permutated by a permutation matrix P and then transmitted through DM-RS port 7 to port 7+(p_DM-RS-1). P(0) is defined as an identity matrix in v-by-v size, and P(i) is generated by circularly rotating a row vector position of P(0). For example, if v=3, P can be defined as Equation 19. Simply, P(i) can be always configured as an identity matrix in v-by-v size and then transmitted without layer permutation. In this case, Transmission scheme 5 is identical to the legacy DM-RS based downlink transmission scheme.

In Equation 28, $r(j)=[r^{(7)}(j) \ldots r^{7+(\nu-1)}(j)]^T$ and $y(j)=[y^{(15)}(j) \ldots y^{15+(P\_CSIRS-1)}(j)]^T$ mean a Walsh spreading applied DM-RS sequence and a CSI-RS antenna port, respectively. Namely, $r^{(n)}(j)$ is a DM-RS sequence corresponding to a DM-RS port n and is in a Walsh spreading applied state. $\nu$ and P_CSIRS and mean the number of Tx layers and the number of CSI-RS antenna ports, respectively. A DM-RS sequence r is precoded by W and then transmitted through CSI-RS port 15 to port 15+(p_CSI-RS-1).

In Equation 28, W is a precoding matrix having a size of p_CSI-RS by v and can be changed in an RB unit that is the smallest. If PRB bundling is applied, W can be changed in unit of bundled RBs. (Or, a base station can inform a UE of a unit of a resource for changing W.) Moreover, like the legacy LD CDD scheme, W can be changed into one value in a restricted codeword set (e.g., {c1, c2, c3 . . . , ck}). As increases, W can be changed in a manner of circularly rotating from c1 to ck in sequence. The base station can inform the UE of the restricted codeword set through RRC signaling.

As a codebook over 4 ports is defined as a dual codeword structure, W can be expressed as W1*W2. W may be changed by changing both a codeword index of W1 and a codeword index of W2, by fixing a codeword index i1 of W1 and changing a codeword index of W2, or by fixing a codeword index i2 of W2 and changing a codeword index of W1. How to make a codeword set of W using one of the three ways can be RRC-signaled to the UE by the base station.

DM-RS is the structure transmitted in a manner of having the same beam applied in an RB unit. If PRB bundling is applied, DM-RS is a structure transmitted in a manner of having the same beam applied in a bundled RB unit. As a result, in Equation 28, W can be changed in an RB unit that is the smallest. On the other hand, according to the legacy LD CDD scheme, W can be changed in v RE units (where, v is the number of Tx layers). As a result, a diversity effect obtained from beam cycling may be limited in comparison with the legacy LD CDD scheme.

Transmission Scheme 6)

$$\begin{bmatrix} y^{(7+f(i))}(i) \\ \vdots \\ y^{(7+f(i)+(\nu-1))}(i) \end{bmatrix} = D(i)U \begin{bmatrix} x^{(0)}(i) \\ \vdots \\ x^{(\nu-1)}(i) \end{bmatrix}$$ [Equation 29]

$$\begin{bmatrix} y^{(15)}(i) \\ \vdots \\ y^{(15+(P\_CSIRS-1))}(i) \end{bmatrix} = [ \begin{bmatrix} W^1(n_{RB}) & W^2(n_{RB}) \end{bmatrix} ] \begin{bmatrix} r^{(7)}(i) \\ \vdots \\ r^{(7+(\nu-1))}(i) \\ r^{(7+(\nu))}(i) \\ \vdots \\ r^{(7+(2\nu-1))}(i) \end{bmatrix}$$ [Equation 30]

In the aforementioned Transmission scheme 1, as W is cycled in an RB unit or a bundled RB unit, the diversity effect reduction due to beam cycling is described. For extreme example, as a size of downlink (DL) data is small, if the data is transmitted on a single RB, beam cycling is not applied at all in Transmission scheme 1). Transmission scheme 6) is characterized in applying beam cycling even within an RB by solving such a problem.

Whether to apply Transmission scheme 6) may be determined depending on the number of scheduled RBs of DL data. For example, the number of scheduled RBs is equal to or smaller than N, Transmission scheme 6) is used. If the number of scheduled RBs is equal to or greater than N, other transmission schemes are usable. Of course, the N value can be RRC-signaled to a UE by a base station.

Although the DM-RS port number is equal to the layer number in Transmission scheme 1), the DM-RS port number is determined as a multiplication of the layer number and the number of beams beam-cycled in a single RB in Transmission scheme 6). Here, in case of applying PRB bundling, the single RB can be substituted with a bundled RB.

Equation 30 shows the relationship between a DM-RS port and a CSI-RS port on the assumption of an example that two beams (i.e., $\{W^1(nRB), W^2(nRB)\}$) are beam-cycled within a single RB. Each of $W^1(nRB)$ and $W^2(nRB)$ is a layer v(=rank v) precoding matrix, which is usable for an antenna of P_CSI-RS ports, in a size of P_CSI-RS by v. Each value of $W^1(nRB)$ and $W^2(nRB)$ can be changed in an RB unit or a bundled RB unit. According to Equation 30, a $W^1(nRB)$ applied effective channel is generated through DM-RS port 7 to port 7+v−1 and a $W^2(nRB)$ applied effective channel is generated through DM-RS port 7+v to port 7+2v−1.

Equation 29 shows the relationship between data and DM-RS port. Compared with Equation 15 of Transmission scheme 1), Equation 29 shows that an offset 'f(i)' is added to a port index. The f(i) is determined by the number of beams beam-cycled in a single RB and the layer number v. Assuming that the number of beams is 2, the f(i) is equal to 0 or v. For example, it is able to set $$f(i) = \left(\left\lfloor \frac{i}{v} \right\rfloor \bmod 2\right) v.$$

As a result, x(0), x(1), ..., x(v−1) are transmitted through DM-RS port 7 to port 7+v−1, and x(v), x(v+1), ..., x(2v−1) are transmitted through DM-RS port 7+v to port 7+2v−1. Hence, as 'i' continues to increase, transmission ports are changed in such a pattern.

If the number of beams beam-cycled in a single RB is extended to N by generalizing Transmission scheme 6), Equation 29 and Equation 30 are changed into Equation 31 and Equation 32, respectively.

$$\begin{bmatrix} y^{(7+f(i))}(i) \\ \vdots \\ y^{(7+f(i)+(v-1))}(i) \end{bmatrix} = D(i)U \begin{bmatrix} x^{(0)}(i) \\ \vdots \\ x^{(v-1)}(i) \end{bmatrix},$$ [Equation 31]

where $f(i) = \left(\left\lfloor \frac{i}{v} \right\rfloor \bmod N\right) v$ $$\begin{bmatrix} y^{(15)}(i) \\ y^{(15+(P\_CSIRS-1))}(i) \end{bmatrix} =$$ [Equation 32]

$$[W^1(n_{RB}) \quad W^2(n_{RB}) \quad \ldots \quad W^N(n_{RB})] \begin{bmatrix} r^{(7)}(i) \\ \vdots \\ r^{(7+(v-1))}(i) \\ r^{(7+(v))}(i) \\ \vdots \\ r^{(7+(2v-1))}(i) \\ \vdots \\ r^{(7+(N-1)(v))}(i) \\ \vdots \\ r^{(7+(Nv-1))}(i) \end{bmatrix}$$

All Equations 29 to 32 relate to transmission schemes that enable beam cycling within a single RB by modifying Transmission scheme 1). The rest of transmission schemes can be modified to enable the beam cycling within a single RB by the same principles. For example, by modifying Transmission scheme 2) in the following manner, beam cycling can be performed within a single RB. DU is substituted with a permutation matrix P(i) in Equation 31, and $W^i(n_{RB})$ is substituted with $W^i(n_{RB})D(0)U$ in Equation 32.

For another example, in case of Transmission scheme 4), by substituting DU and $W^i(n_{RB})$ with $W_{data}(i)D(i)U$ and $W_{DM-Rs}{}^i(n_{RB})$ in Equation 31 and Equation 32, respectively, beam cycling is enabled within a single RB as well.

For another example, in case of Transmission scheme 5), by substituting DU with a permutation matrix P(i) in Equation 31 and always setting P(i) to an identity matrix in Equation 32 despite setting Equation 32 intact, beam cycling is enabled within a single RB as well.

For another example, f (i) in Equation 31 can be represented as (imod2)υ. If this is generalized to represent the number of beam beam-cycled in a single RB as 'N', f(i) can be defined as (imodN)υ.

If the DM-RS port number K is determined as rank*N like Transmission scheme 6), data Rx (reception) power is determined as N/M multiple of DM-RS Rx power (where, when K<3, M=1. Otherwise, M=2).

For example, in case of K=1 and N=2, one half of all subcarriers in a single OFDM symbol carries data through DM-RS port 7 and the other half is transmitted through DM-RS port 8. Hence, in aspect of a single DM-RS port, one half of all subcarriers is used for data transmission and the other half is muted. Hence, by borrowing power of the muted half of the subcarriers, it is able to boost data Tx power doubly. Eventually, by assuming a double of DM-RS Rx power of port 7 on receiving data through DM-RS port 7 as a data Rx power, data decoding is performed. By assuming a double of DM-RS Rx power of port 8 on receiving data through DM-RS port 8 as a data Rx power, data decoding is performed.

For another example, in case of K=2 and N=2, one half of all subcarriers in a single OFDM symbol carries data through DM-RS ports 7 and 8 and the other half is transmitted through DM-RS ports 9 and 10. Hence, in aspect of a single DM-RS port, one half of all subcarriers is used for data transmission and the other half is muted. Hence, by borrowing power of the muted half of the subcarriers, it is able to boost data Tx power doubly. Yet, as the DM-RS ports 7 and 8 and the DM-RS port 9 and 10 are FDMed, it is able to boost DM-RS Tx power transmitted through each port doubly. Eventually, as both of the data power and the DM-RS power transmitted through the respective DM-RS ports are boosted doubly, DM-RS port Rx power and data Rx power are assumed as equal to each other.

Yet, if N>4, data power can be boosted in a manner of exceeding four times. Yet, since a power boosting is limited to 6 dB or below in a single OFDM symbol according to the current standard, if boosting is performed by exceeding four times, it may cause performance degradation. Therefore, as an upper limit is set to four times to the maximum, even if N>4, data power is preferably defined to be boosted up to four times only. As a result, data Rx power is determined as max(4,N)/M times of DM-RS Rx power. Namely, for N that exceeds 4, 4/M times is determined.

For the equations defining the mapping between DM-RS port and CSI-RS port and the equations defining the mapping between data and DM-RS port in the above-described transmission schemes, D*U matrix is used exemplarily and D*U can be substituted with an identity matrix or a symbol encoding matrix corresponding to SFBC, a permutation matrix P, or an arbitrary matrix.

<CSI Feedback for DM-RS Based Downlink Transmission>

In order to support the above-described various transmission schemes, a UE should calculate and feed back CSI by a new method. If a class A CSI process is configured in an open-loop or semi-open-loop transmission scheme, in order to simplify an operation, restriction can be put in a manner of applying a specific codebook configuration only. For example, in an open-loop or semi-open-loop transmission scheme, restriction can be always put in a manner of 'codebook configuration=4'.

In using a class A codebook for an open-loop or semi-open-loop transmission, as restriction is put in a manner of 'codebook configuration=4', the following advantages are expected. In 'codebook configuration=4', a beam group of W1 includes one of a horizontal beam and a vertical beam, which is fixed, and a set of 4 beams in the other direction. For example, although a beam is fixed in a vertical direction, one of 4 beams in a horizontal direction can be selected through W2. Although a UE moves at a fast velocity, since time variation of a channel is generally small in a vertical direction, the structure of W1 in 'codebook configuration=4' reflects such a channel characteristic, thereby being suitable for operating open-loop transmission. Namely, by performing open-loop beamforming in a manner of using a fed-back value for W1 and beam-cycling W2, a vertical beam is fixed and a horizontal beam is cycled within 4 kinds of beams of W1.

Or, by putting restriction in a manner of 'codebook configuration=1' in using a class A codebook, it is able to perform an open-loop transmission. In 'codebook configuration=1', regarding a beam group of W1, each of a horizontal beam and a vertical beam is fixed to 1. For example, if W1 is selected, all beams are fixed in vertical and horizontal directions, and a selection can be made through W2 using a phase rotation value (co-phase) only. Hence, since time variation of a channel is not big, the open-loop transmission of 'codebook configuration=1' is advantageous in an environment that applying a phase rotation value (co-phase) component applied to h-pol and v-pol only is advantageous.

Based on the above description, when a base station performs an open-loop transmission, a UE expects that a specific codebook configuration is not established in a class A codebook. Here, the specific codebook configuration may include '2, 3' or '1, 2, 3'.

In the following a CSI feedback method for a DM-RS based open-loop transmission scheme and a CSI feedback method for a DM-RS based semi-open-loop transmission scheme are separately described.

A) CSI Feedback Method for a DM-RS Based Open-Loop Transmission Scheme

In open-loop CSI feedback, a UE feeds back RI and CQI only to a base station like LD CDD transmission. Equation 33 shows the relationship between CSI-RS port and data, which is assumed by a UE in a CSI calculation process, in case of applying the aforementioned Transmission scheme 1) or 2).

$$\begin{bmatrix} y^{(15)}(i) \\ \vdots \\ y^{(7+(P\_CSIRS-1))}(i) \end{bmatrix} = W(n_{RB})D(i)U \begin{bmatrix} x^{(0)}(i) \\ \vdots \\ x^{(v-1)}(i) \end{bmatrix} \quad \text{[Equation 33]}$$

where $W(n_{RB}) = C(i_1, i_2)$ and $i_1 = f_1(n_{RB})$, $i_2 = f_2(n_{RB})$

C is a dual codebook defined as two PMIs i1 and i2, and such a dual codebook is used for CSI-RS of 4 ports or more. f1 and f2 are functions for determining i1 and i2 according to $n_{RB}$, respectively, and RB-unit beam cycling is performed according to f1 and f2. Of course, if PRB bundling is applied, $n_{RB}$ is substituted not with an index of a single RB but with an index of a bundled RB and beam cycling in a bundled RB unit is performed. As a result, W is determined through beam cycling in a beam set $\{C(i1,i2)|i1=f1(n_{RB}), i2=f2(n_{RB})\}$.

In case of using Transmission scheme 3), a UE calculates CSI by changing $W(n_{RB})$ into $W(i)$ in Equation 33. As a result, beam cycling is enabled not in an RB unit but in an RE unit. (Of course, a factor of each of f1 and f2 should be changed into i from nRB.) Eventually, resolution in a beam cycling unit is changed only but a beam cycling scheme mentioned in the following is applicable intactly.

CSI feedback for Transmission scheme 4) shall be described in a CSI feedback method for a DM-RS based semi-open-loop transmission scheme mentioned in the following.

In case of using Transmission scheme 5), a UE calculates CSI by changing DU into P(i) in Equation 33. Eventually, a presence or non-presence of application of U is changed only and the beam cycling method in the following is applicable intactly.

In case of using Transmission scheme 6), a UE calculates CSI using Equation 34 in the following.

$$\begin{bmatrix} y^{(15)}(i) \\ \vdots \\ y^{(15+(P\_CSIRS-1))}(i) \end{bmatrix} = W^m(n_{RB})D(i)U \begin{bmatrix} x^{(0)}(i) \\ \vdots \\ x^{(v-1)}(i) \end{bmatrix}, \quad \text{[Equation 34]}$$

where $W^m(n_{RB}) = C(i_1, i_2)$ and $i_1 = f_1^m(n_{RB})$, $i_2 = f_2^m(n_{RB}), m = 1, 2, 3, \ldots N$ In Equation 34, N means the number of beams cycled in a single RB. If PRB bundling is applied, N means the number of beams cycled in a bundled RB. A value of m is changed according to a data transmitted RE or RE group and determined by f(i) of Equation 31 in Transmission scheme 6). For example, it is determined as m=f(i)/v+1. More simply, after setting f(i)=(i mod N)/v, it is determined as m=(i mod N)+1. Here, v means a rank transmitted to a UE.

First of all, in case of configuring a class B CSI process (where, K=1) or a legacy CSI process, beam cycling is described.

First of all, it is able to consider a beam cycling method by changing i1 and i2 both.

In case of Release-12 8Tx Codebook, a set of DFT vectors determined as i1 consists of highly correlated vectors. Hence, a beam is preferably cycled by changing i1. And, i2 may be restricted to use a vector at a specific position in a DFT vector set only all the time. Yet, beam cycling is performed by changing a phase rotation value of i2. In case of Release-12 8Tx Codebook, since DFT vectors selected by i2 are highly correlated to each other in a state that i1 is fixed to a specific value, a diversity gain attributed to the vector selection is not greater than a diversity gain attributed to phase rotation. Cycling is performed by prioritizing the phase rotation value change.

Next, it is able to consider a beam cycling method by fixing i1 but changing i2 only.

In case of Release-12 4Tx Codebook, a set of DFT vectors determined as i1 consists of lowly correlated vectors (orthogonal to each other). Hence, although i1 is fixed to a specific value (e.g., 0), a set is configured with DFT vectors indicating various channel directions. And, i2 selects some vectors from the vector set determined as i1 and also selects a phase rotation value α. Namely, i2 selects v from a vector set and also selects α, whereby each column vector of a final codeword matrix is generated in form of [vT αvT]T.

Since a DFT vector v configuring each column vector in a rank 2 codeword may be differentiated or equalized according to an i2 value, it can be cycled in a manner of being limited to i2, which equalizes v that configures two column vectors, for beam cycling. On the contrary, it can be cycled in a manner of being limited to i2 that differentiates v configuring two column vectors. Or, i2 can be cycled in a state that a is fixed to a single value without being changed. In case of Release-12 4Tx Codebook, since DFT vectors selected by i2 in a state that i1 is fixed to a specific value have low correlation, a diversity gain attributed to a vector selection is important. Hence, cycling is performed by prioritizing a vector selection than a phase rotation value change.

Moreover, in case of Release-12 8Tx Codebook, since a set of DFT vectors determined as i1 consists of highly correlated vectors, if i1 is fixed to a specific value (e.g., 0), a set is configured with DFT vectors indicating a specific channel direction. Hence, it is not preferable that i1 is fixed.

Next, it is able to consider a beam cycling method by changing i1 but fixing i2.

In case of Release-12 8Tx Codebook, since a set of DFT vectors determined as i1 consists of highly correlated vectors, it is preferable that beam is cycled by changing i1. The i2 can be restricted to use a vector always located at a specific location only within a DFT vector set and a phase rotation of i2 can be fixed to a single value.

In case of Release-12 4Tx Codebook, since a set of DFT vectors determined as i1 consists of lowly correlated vectors (orthogonal to each other), if i2 is fixed but i1 is changed, selected DFT vectors may be configured with highly correlated vectors. Hence, it is not preferable that beam cycling is performed in a manner of changing i1 but fixing i2.

Particularly, the present invention proposes to perform a beam cycling by changing i1 in case of Release-12 8Tx Codebook or a beam cycling by fixing i1 but changing i2 in case of Release-12 4Tx Codebook.

A beam cycling in case of configuring a class A CSI process is described as follows.

It is able to consider a beam cycling method by changing i1 and i2 both.

In case of Release-13 Class A Codebook, a DFT vector set determined as i1 consists of highly correlated vectors. Hence, a beam is preferably cycled by changing i1. And, i2 may be restricted to use a vector at a specific position in a DFT vector set only all the time. Yet, beam cycling is performed by changing a phase rotation value of i2.

It is able to consider a beam cycling method by fixing i1 but changing i2 only.

In case of Release-13 Class A Codebook, since a DFT vector set determined as i1 consists of highly correlated vectors. Hence, if i1 is fixed to a specific value (e.g., 0), a set is configured with DFT vectors indicating a specific channel direction. Hence, it is not preferable that i1 is fixed.

A beam cycling method by changing i 1 but fixing i2 is considered as well.

In case of Release-13 Class A Codebook, a DFT vector set determined as i1 consists of highly correlated vectors. Hence, it is preferable that beam is cycled by changing i1. Moreover, i2 can be restricted to use a vector always located at a specific location only within a DFT vector set and a phase rotation of i2 can be fixed to a single value.

B) CSI Feedback Method for a DM-RS Based Semi-Open-Loop Transmission Scheme

In CSI feedback for DM-RS based semi-open-loop transmission, a UE feeds back CRI or i1 or i11 to a base station as well as RI and CQI. Equation 35 shows the relationship between CSI-RS port and data, which is assumed by a UE in a CSI calculation process, in case of applying Transmission scheme 1), Transmission scheme 2), or Transmission scheme 4).

$$\begin{bmatrix} y^{(15)}(i) \\ \vdots \\ y^{(15+(P\_CSIRS-1))}(i) \end{bmatrix} = W(n_{RB})D(i)U \begin{bmatrix} x^{(0)}(i) \\ \vdots \\ x^{(\nu-1)}(i) \end{bmatrix} \quad \text{[Equation 35]}$$

where $W(n_{RB}) = C(i_1, i_2)$ and $i_2 = f_2(n_{RB})$

In case of using Transmission scheme 4, in Equation 35, $W(n_{RB})$ is defined as $W_{DM-RS}(n_{RB}) \odot W(i)$. $W_{DM-RS}(n_{RB})$ and $W(i)$ are defined in Equation 22 and Equation 23 and mean a precoding matrix applied to a DM-RS and a precoding matrix applied between a data and a DM-RS port, respectively. $\odot$ may be defined as a product of matrixes, a Kronecker product of matrixes, or one of other various operations. In the above equation, D(i)U can be substituted with P(i) or an identity matrix.

$W_{DM-RS}(n_{RB})$ is fed back to a base station by a UE, and W(i) is determined as a beam cycling pattern agreed between the UE and the base station. In case that W(i) has a dual codebook structure (i.e., if W(i)=C(i1,i2)), the beam cycling pattern agreed between the UE and the base station is determined as i1=f1(i) and i2=f2(i) by the functions f1 and f2. The UE searches a codebook of $W_{DM-RS}(n_{RB})$ for an optimal codeword, which maximizes CQI, under the condition of meeting QoS and then reports the found optimal codeword to the base station. Here, W(i) is determined according to the beam cycling scheme determined by f1 and f2. For reference, if W(i) has a single codebook structure like the legacy codebook, since a PMI is defined as a single index, there exists only a single function f1(i) that determines a beam cycling pattern.

In order to reduce UE's calculation amount and complexity in the above operation, the codebook of $W_{DM-RS}(n_{RB})$ can be restricted to always use a rank-1 codebook and a separate RI for $W_{DM-RS}(n_{RB})$ may not be reported. If the codebook of $W_{DM-RS}(n_{RB})$ supports various ranks, a UE should report a separate RI for $W_{DM-RS}(n_{RB})$, which may be reported together with an RI of W(i) through joint encoding) or reported only separately from the RI of W(i).

According to another operating method of Transmission scheme 4), a UE feeds back $W_{DM-RS}(n_{RB})$ and some information of W(i) to a base station and the rest of the information of W(i) is determined as a beam cycling pattern agreed between the UE and the base station. The UE finds an optimal codeword, which maximizes a CQI under the condition that QoS is met in the codebook of $W_{DM-RS}(n_{RB})$, additionally finds information of i1, i11, i12, or i2, and then reports them to the base station. In this case, the rest of the information of W(i) (e.g., information of i2) is determined according to a determined beam cycling scheme.

In case of using Transmission scheme 6), a UE calculates CSI using Equation 36.

$$\begin{bmatrix} y^{(15)}(i) \\ \vdots \\ y^{(15+(P\_CSIRS-1))}(i) \end{bmatrix} = W^n(n_{RB})D(i)U \begin{bmatrix} x^{(0)}(i) \\ \vdots \\ x^{(\nu-1)}(i) \end{bmatrix}, \quad \text{[Equation 36]}$$

-continued where $W^n(n_{RB}) = C(i_1, i_2)$ and $i_2 = f_2^m(n_{RB})$, $m = 1, 2, 3, \ldots, N$ In Equation 36, N means the number of beams cycled in a single RB. If PRB bundling is applied, N means the number of beams cycled in a bundled RB. A value of m is changed according to a data transmitted RE or RE group and determined by f(i) of Equation 31 in Transmission scheme 6). For example, it is determined as m=f(i)/v+1. More simply, after setting f(i)=(i mod N)/v, it is determined as m=(i mod N)+1. Here, v means a rank transmitted to a UE.

Moreover, a UE for which a class A CSI process, a class B CSI process or a legacy CSI process is configured can feed back i1. In this case, the UE finds optimal i1 from Equation 34 and then feeds back the found optimal i1. Namely, CQI and RI are not calculated by changing i1 by a beam cycling scheme determined using $i_1 = f_1(n_{RB})$. Instead, the UE reports optimal i1, which maximizes a CQI for all i1 values possible under the QoS met condition, to the base station. In this case, i2 is determined by a beam cycling scheme determined by f2.

Or, a UE having a class A CSI process configured therefor can feed back i11. In this case, the UE finds optimal i11 from Equation 34 and then feeds it back. Since $i_1$ is determined as i11 and i12, the i12 is changed according to a beam cycling scheme determined using $i_{12} = f_{12}(n_{RB})$ and optimal i1, which maximizes CQI for all i11 values possible under the QoS met condition, to a base station. In this case, i2 is determined by a beam cycling scheme determined by f2. In case that the UE feeds back i11, since a feedback payload is decreased in comparison with i1, it can be reported together with an RI. In some implementations, a k value is additionally defined over rank 3. In this case, i1 is determined as k, i11, i12. It is preferable that k is operated in a manner of being always fixed to a single value (e.g., 0) in a semi-open-loop transmission scheme or an open-loop transmission scheme.

In case of a semi-open-loop scheme in which a UE feeds back CRI only without feedback of i1 or i11, it is substantially identical to CSI calculation in an open-loop scheme. Since CRI just determines whether to perform channel estimation becoming a CSI calculation target on which BF CSI-RS, a CSI calculation scheme is not different from that of an open-loop scheme.

In case of using Transmission scheme 3, a UE calculates CSI by changing $W(n_{RB})$ into W(i) in Equation 34. As a result, beam cycling is enabled not in an RB unit but in an RE unit. Of course, a factor of f3 should be also changed into i from nRB. Eventually, a beam cycling unit is changed only but a beam cycling scheme in the following is applicable intactly.

In case of using Transmission scheme 5, a UE calculates CSI by changing DU into P(i) in Equation 34. Eventually, a presence or non-presence of application of U is changed only but a beam cycling scheme in the following is applicable intactly.

First of all, in case of configuring a class B CSI process or a legacy process, a beam cycling is described as follows.

In case of a scheme of a beam cycling by changing both i1 and i2, if a UE feeds back i1, since i1 is determined as the corresponding value, this scheme is not applicable.

Let's consider a scheme of performing a beam cycling in a manner of fixing i1 but changing i2 only.

In case that a UE feeds back i1, i1 is determined as the corresponding value and a determined beam cycling scheme is applied to i2. Hence, as described above, this is a beam cycling scheme appropriate for a 4Tx codebook. Yet, in case of a middle-speed (e.g., 30 km or lower) UE, as a channel does not change vary fast, a scheme of cycling a beam in a manner of fixing i1 to a fed-back value but changing i2 only may be valid for an 8Tx codebook as well.

Finally, in case of a scheme of performing a beam cycling in a manner of changing i1 but fixing i2, if a UE feeds back i1, as i1 is determined as the corresponding value, this scheme is not applicable.

In the following, a beam cycling in case of configuring a class A CSI process is described.

Let's consider a scheme of performing a beam cycling by changing both i1 and i2.

In case of Release-13 class A codebook, a DFT vector set determined as i1 consists of highly correlated vectors. Hence, a beam is preferably cycled by changing i1. And, i2 may be restricted to use a vector at a specific position in a DFT vector set only all the time. Yet, beam cycling is performed by changing a phase rotation value of i2.

In case that a UE feeds back i1, a value of i11 is determined from i1. And, i12 performs a beam cycling in a determined manner. As a result, a vertical beam is fixed by receiving feedback from the UE but a beam cycling is applied to a horizontal beam. Generally, a vertical velocity of a UE is not fast but a horizontal velocity of the UE is fast. Hence, using this scheme, data can be transmitted in a vertical direction by a closed-loop scheme and data can be transmitted in a horizontal direction by an open-loop scheme. Of course, a scheme of performing abeam cycling on i11 by determining an i12 value from i1.

On the other hand, if the UE feeds back i11, i11 is determined as the corresponding value and i12 performs a determined beam cycling scheme. Additionally, the UE may feed back i12 instead of i11. Through separate signaling, the base station may inform the UE which one of i11 or i12 will be fed back. Or, the UE can report one of i11 and i12 to the base station.

Consider a scheme of performing a beam cycling by fixing i1 but changing i2 only.

In case that a UE feeds back i1, i1 is determined as the corresponding value and i2 is cyclically applied by a determined scheme. In case of a middle-speed (e.g., 30 km or lower) UE, as a channel does not change vary fast, a scheme of cycling a beam in a manner of fixing i1 to a fed-back value but changing i2 only may be valid.

Finally, in case of a scheme of performing a beam cycling in a manner of changing i1 but fixing i2, although this scheme operates in the same manner as a scheme of performing a beam cycling by changing both i1 and i2, i2 is fixed yet.

<Definition of Beam Cycling Set>

Meanwhile, as described in the following, by defining a beam cycling set, it is able to perform a beam cycling in a resource unit (e.g., RB unit, bundled RB unit, RE unit amounting to the number of layers, etc.) determined within the corresponding set. In doing so, a base station can differently operate a beam cycling set according to a size of a scheduled RB. For example, if the number of scheduled RBs is equal to or smaller than M, a beam cycling set 1 is used. If the number of scheduled RBs is greater than M, a beam cycling set 2 is used.

(1) Beam Cycling Set in 4 Tx Codebook for Rank 2

For clarity of description, a 4 Tx codebook for rank 2 is exemplarily shown in Table 2.

TABLE 2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}} \begin{bmatrix} v'_m & v'_{m'} \\ \varphi_n v'_m & -\varphi_n v'_{m'} \end{bmatrix}$ Particularly, in table 2, n and First of all, i1 is fixed to 0 or uses a value fed back by a UE, thereby not being cycled.

Alt 1: A beam cycling set of i2 is {0, 1, 4, 5}. A vector selected through 'i2= or 1' from DFT vectors defined as i1 is orthogonal to a vector selected through 'i2=1 or 5'. A phase rotation value of W determined through 'i2=0 or 4' is different from a phase rotation value of W determined through 'i2=1 or 5'. Eventually, the cycling beams determined as combinations of i1 and i2 are configured with DFT vectors orthogonal to each other or have different phase rotation values, thereby being configured with beams in various (or different) directions to obtain a diversity effect.

Alt 2: A beam cycling set of i2 is {0, 2, 4, 6}. A vector selected through 'i2=0' from DFT vectors defined as i 1 is orthogonal to a vector selected through 'i2=4'. Moreover, a vector selected through 'i2=2' is orthogonal to a vector selected through 'i2=6'. A phase rotation value of W is equal for all i2 values. Eventually, the cycling beams determined as combinations of i1 and i2 are configured with various DFT vectors orthogonal to each other despite having the same phase rotation value, thereby being configured with beams in various (or different) directions to obtain a diversity effect.

Alt 3: A set is configured with a union of two sets Alt 1 and Alt 2.

Alt 4: A beam cycling set of i2 is {0, 4, 8, 10}. In Alt 1, a DFT vector configuring two beams (corresponding to two layers) is always the same. For more various beamformings, {8, 10} is added by ignoring such restrictions.

Alt 5: A beam cycling set of i2 is {0, 4, 8, 12}. In Alt 1, a DFT vector configuring two beams (corresponding to two layers) is always the same. For more various beamformings, {8, 12} is added by ignoring such restrictions.

Alt 6: A beam cycling set of i2 is {0, 4, 9, 11}. In Alt 2, a DFT vector configuring two beams (corresponding to two layers) is always the same and a phase shift value is the same as well. For more various beamformings, {9, 11} is added by ignoring such restrictions.

Alt 7: A beam cycling set of i2 is {0, 4, 9, 13}. In Alt 2, a DFT vector configuring two beams (corresponding to two layers) is always the same and a phase shift value is the same as well. For more various beamformings, {9, 13} is added by ignoring such restrictions.

(2) Beam Cycling Set in 8 Tx Codebook for Rank 2

For clarity of description, an 8 Tx codebook for rank 2 is exemplarily shown in Table 2.

TABLE 3

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ Particularly, in Table 3, $\phi_n = e^{j\pi n/2}$ and $v_m = [1 \ e^{j2\pi m/32} \ e^{j4\pi m/32} \ e^{j6\pi m/32}]^T$.

First of all, i1 is fixed to 0 or uses a value fed back by a UE, thereby not being cycled.

Alt 1: A beam cycling set of i2 is {0, 1, 4, 5}. A vector selected through 'i2=0 or 1' from DFT vectors defined as i1 has high correlation to a vector selected through 'i2=4 or 5'. A phase rotation value of W determined through 'i2=0 or 4' is different from a phase rotation value of W determined through 'i2=1 or 5'. Eventually, the cycling beams determined as combinations of i1 and i2 are configured with DFT vectors highly correlated to each other or have different phase rotation values, thereby being configured with beams in various (or different) directions to obtain a diversity effect. Since a beam cycling is performed within a DFT vector having high correlation, a UE preferably reports i1 in semi-open-loop and an appropriate velocity of the UE includes a middle velocity (e.g., 30 km).

Alt 2: A beam cycling set of i2 is {0, 2, 4, 6}. Vectors selected through 'i2=0, 2, 4, 6' from DFT vectors defined as i1 are highly correlated to each other. A phase rotation value of W is equal for all i2 values. Eventually, the cycling beams determined as combinations of i1 and i2 are configured with highly correlated DFT vectors having the same phase rotation value, thereby obtaining a diversity effect within a beam in a similar direction. Therefore, a UE preferably reports i1 in semi-open-loop and an appropriate velocity of the UE includes a middle velocity (e.g., 30 km).

Alt 3: A set is configured with a union of two sets Alt 1 and Alt 2.

Alt 4: A beam cycling set of i2 is {0, 4, 8, 10}. In Alt 1, a DFT vector configuring two beams (corresponding to two layers) is always the same. For more various beamformings, {8, 10} is added by ignoring such restrictions.

Alt 5: A beam cycling set of i2 is {0, 4, 8, 12}. In Alt 1, a DFT vector configuring two beams (corresponding to two layers) is always the same. For more various beamformings, {8, 12} is added by ignoring such restrictions.

Alt 6: A beam cycling set of i2 is {0, 4, 9, 11}. In Alt 2, a DFT vector configuring two beams (corresponding to two layers) is always the same and a phase shift value is the same as well. For more various beamformings, {9, 11} is added by ignoring such restrictions.

Alt 7: A beam cycling set of i2 is {0, 4, 9, 13}. In Alt 2, a DFT vector configuring two beams (corresponding to two layers) is always the same and a phase shift value is the same as well. For more various beamformings, {9, 13} is added by ignoring such restrictions.

In some implementations, a beam cycling set for i1 may be configured as follows to cyclically apply i1.

Alt 8: a beam cycling set of i1 is {0, 4, 8, 12}. Here, i2 is fixed to 0 or a value fed back from a UE. In an 8tx codebook for rank 2, i1 is used for the usage of designating a vector set configured with 4 DFT vectors. Four vectors existing in a single vector set are vectors highly correlated to each other. As i2 is fixed to 0, a rank 2 W is generated by selecting a first DFT vector existing in the vector set. Since a first DFT vector existing in a vector set of i1=0, a first DFT vector existing in a vector set of i1=4, a first DFT vector existing in a vector set of i1=8, and a first DFT vector existing in a vector set of i1=12 are orthogonal to each other, various beams can be formed through the beam cycling set.

Additionally, it is possible to configure a beam cycling set of i2 with {0, 1} without fixing i2. In this case, it is able to form various beams by changing a phase rotation value, i.e., a co-phase by i2.

Alt 9: a beam cycling set of i1 is {0, 4, 8, 12}. Here, i2 is fixed to 8 or a value fed back from a UE. In an 8tx codebook for rank 2, i1 is used for the usage of designating a vector set configured with 4 DFT vectors. Four vectors existing in a single vector set are vectors highly correlated to each other. As i2 is fixed to 8, a rank 2 W is generated by selecting a first DFT vector and a second DFT vector existing in the vector set. Since a first DFT vector existing in a vector set of i1=0, a first DFT vector existing in a vector set of i1=4, a first DFT vector existing in a vector set of i1=8, and a first DFT vector existing in a vector set of i1=12 are orthogonal to each other, various beams can be formed through the beam cycling set.

Moreover, since a second DFT vector existing in a vector set of i1=0, a second DFT vector existing in a vector set of i1=4, a second DFT vector existing in a vector set of i1=8, and a second DFT vector existing in a vector set of i1=12 are orthogonal to each other, various beams can be formed through the beam cycling set.

Additionally, it is possible to configure a beam cycling set of i2 with {8, 9} without fixing i2. In this case, it is able to form various beams by changing a phase rotation value, i.e., a co-phase by i2.

(3) Beam Cycling Set in 8 Tx Codebook for Rank 3

For clarity of description, an 8 Tx codebook for rank 3 is exemplarily shown in Table 4.

TABLE 4

| $i_1$ | $i_2$ | | | |
|---|---|---|---|---|
|  | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ | $\tilde{W}^{(3)}_{8i_1+8,8i_1,8i_1}$ |
| $i_1$ | $i_2$ | | | |
|  | 4 | 5 | 6 | 7 |
| 0-3 | $W^{(3)}_{8i_1+2,8i_1+2,8i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |
| $i_1$ | $i_2$ | | | |
|  | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |
| $i_1$ | $i_2$ | | | |
|  | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $W^{(3)}_{m,m',m''} = \frac{1}{\sqrt{24}} \begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}} \begin{bmatrix} v_m & v_{m'} & v_{m''} \\ v_m & -v_{m'} & -v_{m''} \end{bmatrix}$ Particularly, in Table 4, $\phi_n = e^{j\pi n/2}$ and $v_m = [1 \ e^{j2\pi m/32} \ e^{j4\pi m/32} \ e^{j6\pi m/32}]^T$.

First of all, i1 is fixed to 0 or uses a value fed back by a UE, thereby not being cycled. A beam cycling set of i2 is configurable as follows.

Alt 1: A beam cycling set of i2 is {0, 1, 2, 3}. In this case, as a first vector and a fifth vector are always selected from a DFT vector set defined as i1, W is configured. Here, the selected first and fifth vectors are orthogonal to each other. i2=0 and i2=3 differ from each other in a co-phase component. i2=1 and i2=2 differ from each other in a co-phase component. Hence, W is configured with beams in various (or different) directions, whereby a diversity effect is obtained.

Alt 2: A beam cycling set of i2 is {0, 1, 8, 9}. If i2 is 0 or 1, as a first vector and a fifth vector are always selected from a DFT vector set defined as i1, W is configured. Here, the selected first and fifth vectors are orthogonal to each other. If i2=8 or 9, as a third vector and a seventh vector are always selected from a DFT vector set defined as i1, W is configured. Here, the selected third and seventh vectors are orthogonal to each other. A rank 3 W is generated using the first, fifth, third and seventh vectors according to i2 and W is eventually configured with beams in various (or different) directions, whereby a diversity effect is obtained.

Alt 3: A beam cycling set of i2 is {0, 1}.

Additionally, it is possible to configure a beam cycling set of i1 with {0, 2} without fixing i1. In this case, it is able to form various beams by i1.

In some implementations, a beam cycling set for i1 may be configured with {0, 2} to cyclically apply i1. The i2 is fixed to 0 or uses a value fed back by a UE, thereby not being cycled. A DFT vector set defined as i1=0 and a DFT vector set defined as i1=2 are mutually exclusive. Namely, an element of intersection of two sets does not exist. As it is fixed to i2=0, as first and fifth vectors are always selected from a DFT vector set, W is configured. And, W is configured with beams in various (or different) directions according to i1, whereby a diversity effect is obtained.

Additionally, it is possible to configure a beam cycling set of i1 with {0, 2} without fixing i2. In this case, it is able to form various beams by changing a phase shift value by i1.

(4) Beam Cycling Set in 8 Tx Codebook for Rank 4

For clarity of description, an 8 Tx codebook for rank 4 is exemplarily shown in Table 5.

TABLE 5

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Particularly, in Table 5, $\phi_n = e^{j\pi n/2}$ and $v_m = [1 \; e^{j2\pi m/32} \; e^{j4\pi m/32} \; e^{j6\pi m/32}]^T$.

First of all, i1 is fixed to 0 or uses a value fed back by a UE, thereby not being cycled. A beam cycling set of i2 is configurable as follows.

Alt 1: A beam cycling set of i2 is {0, 1, 4, 5}.

If i2=0 or 1, as a first vector and a fifth vector are always selected from a DFT vector set defined as i1, W is configured. Here, the selected first and fifth vectors are orthogonal to each other. If i2=4 or 5, as a third vector and a seventh vector are always selected from a DFT vector set defined as i1, W is configured. Here, the selected third and seventh vectors are orthogonal to each other. A rank 4 W is generated using the first, fifth, third and seventh vectors according to i2 and W is eventually configured with beams in various (or different) directions, whereby a diversity effect is obtained. Moreover, as i2=0 and i2=1 are configured with different co-phase components and i2=4 and i2=5 are configured with different co-phase components, W is eventually configured with beams in various (or different) directions, whereby a diversity effect is obtained.

Alt 2: A beam cycling set of i2 is {0, 2, 4, 6}. If i2=0, as a first vector and a fifth vector are always selected from a DFT vector set defined as i1, W is configured. Here, the selected first and fifth vectors are orthogonal to each other. If i2=2, as a second vector and a sixth vector are always selected from a DFT vector set defined as i1, W is configured. Here, the selected second and sixth vectors are orthogonal to each other. If i2=4, as a third vector and a seventh vector are always selected from a DFT vector set defined as i1, W is configured. Here, the selected third and seventh vectors are orthogonal to each other. If i2=6, as a fourth vector and an eighth vector are always selected from a DFT vector set defined as i 1, W is configured. Here, the selected fourth and eighth vectors are orthogonal to each other. Moreover, i2 configures W with the same co-phase component for 0, 2, 4 and 6. A rank 4 W is generated using the first to eighth vectors according to i2 and W is eventually configured with beams in various (or different) directions, whereby a diversity effect is obtained.

Alt 3: A beam cycling set of i2 is {0, 1}.

Additionally, it is possible to configure a beam cycling set of i1 with {0, 2} without fixing i1. In this case, it is able to form various beams by i1.

In some implementations, a beam cycling set for i1 may be configured with {0, 2} to cyclically apply i1. The i2 is fixed to 0 or uses a value fed back by a UE, thereby not being cycled. A DFT vector set defined as i1=0 and a DFT vector set defined as i1=2 are mutually exclusive. Namely, an element of intersection of two sets does not exist. As it is fixed to i2=0, as first and fifth vectors are always selected from a DFT vector set, W is configured. And, W is configured with beams in various (or different) directions according to i1, whereby a diversity effect is obtained.

Additionally, it is possible to configure a beam cycling set of i1 with {0, 2} without fixing i2. In this case, it is able to form various beams by changing a phase shift value by i1.

<Reduction of DM-RS Overhead in DM-RS Based DL Transmission>

In order to reduce DM-RS overhead in the aforementioned DM-RS based open-loop transmission scheme, it is preferable that a DM-RS port CDMed to the same RE is preferentially used. For example, since the proposed scheme 6 requires the DM-RS port number amounting to N times of a transmission rank, DM-RS overhead can be reduced by the following method.

For example, when a transmission rank is 1 and the number of beams cycled in an RB or bundled RB is N, total N DM-RS ports should be transmitted. If N=3, the DM-RS overhead can be maintained low (e.g., as 12 RE/RB) using DM-RS ports 7, 8 and 11 or DM-RS port 7, 8 and 13. If N=4, the DM-RS overhead can be maintained low (e.g., as 12 RE/RB) using DM-RS ports 7, 8, 11 and 13.

For another example, when a transmission rank is 2 and the number of beams cycled in an RB or bundled RB is N, total 2N DM-RS ports should be transmitted. If N=2, the DM-RS overhead can be maintained low (e.g., as 12 RE/RB) using DM-RS ports 7, 8, 11 and 13.

Likewise, in the remaining proposed schemes 1) to 5), for the case that the DM-RS port number is 3 (or 4), the DM-RS overhead can be maintained low (e.g., as 12 RE/RB) using DM-RS ports 7, 8 and 11 or DM-RS ports 7, 8 and 13 (or DM-RS ports 7, 8, 11 and 13).

<Beam Cycling Unit in DM-RS Based DL Transmission>

The above open-loop transmission schemes enable a beam cycling in a unit as large as a bundled RB unit or in a unit as small as an RB unit, an RE group or an RE unit. Moreover, a layer permutation is additionally enabled in an RE group unit or an RE unit. Thus, as a unit of a resource for such a beam cycling or a layer permutation gets smaller, a UE can obtain a more diversity effect. But, high complexity is required disadvantageously. Hence, it is preferable that a base station configures a unit of a resource for a beam cycling or a layer permutation and a presence or non-presence of application of the layer permutation in consideration of such advantages and disadvantages and then informs a UE of such configurations.

For example, in case of performing a layer permutation using DU or P matrix in Transmission schemes 1) to 6), a base station signals whether to use DU or P or whether to apply the layer permutation by substitution with an identity matrix to a UE. Accordingly, assuming a presence or non-presence of the application of the layer application, the UE calculates CSI and receives data.

Moreover, a base station may determine whether to perform a beam cycling on an RE (group) level of an RB (group) level and then inform a UE of the determination. In case of performing the beam cycling on the RE (group) level, a transmission scheme (e.g., Transmission schemes 3) to 6)) capable of a beam cycling on an RE (group) level is used. In case of performing the beam cycling on the RB (group) level, a transmission scheme (e.g., Transmission schemes 1), 2) and 5)) capable of a beam cycling on an RB (group) level is used.

Similarly, a transmission scheme A (e.g., a transmission scheme supporting a beam cycling on an RE (group) level) and a transmission scheme B (e.g., a transmission scheme supporting a beam cycling on an RB (group) level) are defined in advance. And, a base station informs a UE that which open-loop transmission scheme is used. Of course, assuming a signaled beam cycling level and transmission scheme, the UE calculates CSI and receives data.

Or, using multiple CSI processes, the base station sends a signaling to the UE so as to enable the UE to calculate CSI on the assumption of the transmission scheme A in a CSI process 1 and enable the UE to calculate CSI on the assumption of the transmission scheme B in a CSI process 2. This signaling is an RRC signaling and may be defined for each CSI process. Having received CSI corresponding to two CSI processes, the base station can inform the UE that data transmission was actually performed using which transmission scheme, through DCI. Each of the transmission scheme A and the transmission scheme B is an open-loop or semi-open-loop transmission method and means a transmission scheme in which a unit of a resource for performing a beam cycling or a layer permutation, a presence or non-presence of application of the layer permutation or the like is configured differently.

The base station may not signal a unit of a resource for performing a beam cycling or a layer permutation or a presence or non-presence of application of the layer permutation to the UE. Instead, according to a scheduled RB, the base station and the UE can agree to a unit of a resource or a presence or non-presence of application of a layer permutation. For example, if there are many scheduled RBs of the UE, since a sufficient diversity effect can be obtained despite increasing a resource unit, a large resource unit is configured. On the contrary, if there are less scheduled RBs, a small resource unit is configured preferably. For example, a unit of a beam cycling resource or a unit of a layer permutation resource can be determined like Table 6.

TABLE 6

| Scheduled RB size (K) | Beam cycling resource unit | Layer permutation unit & presence or non-presence of application thereof |
|---|---|---|
| K =< 10 RB | RE level | On, RE level |
| 10 RB < K =< 20 RB | RE group level | On, RE level |
| 20 RB < K =< 50 RB | Single RB level | OFF |
| 50 RB < K | Bundled RB level | OFF |

<Determination of Transmission Scheme>

Depending on a channel state such as UE's moving velocity, channel's time variation or the like, priority between an open-loop scheme and a closed-loop scheme exists in an MIMO transmission scheme. Moreover, within the open loop, there exists a single open-loop transmission scheme that guarantees optimal performance in a current channel state according to detailed configurations. Namely, there are an optimal transmission scheme and an optimal CSI calculation & feedback scheme according to a current channel state. And, the optimal transmission scheme and the optimal CSI calculation & feedback scheme are determined according to the following configurations.

Closed-loop transmission scheme assumed in CSI calculation or data reception

Open-loop transmission scheme assumed in CSI calculation or data reception [aforementioned Transmission schemes 1] to 6) and various modifications thereof]

Beam cycling resource unit (bundled RB, single RB, RE group, etc.) assumed in CSI calculation or data reception A presence or non-presence of layer permutation assumed in CSI calculation or data reception Partial PMI fed back by a UE (e.g., the partial OMI means i11, i12, i1 or the like that is not a complete PMI. On the assumption that the remaining partial PMI except the partial PMI is beam-cycled by a determined scheme, a partial PMI achieving an optimal CQI is calculated and fed back.)

A remaining partial PMI (e.g., 'i12 and i2', i11 and i2', 'i2', 'co-phase component of i2', etc.) performing a beam cycling by a determined scheme without being fed back by a UE A beam cycling set assumed in CSI calculation or data reception (e.g., in case of performing a beam cycling on i2, it can be defined as i2∈{0,1,2,3} and the beam cycling is performed sequentially from i2=0 to 3)

In order to maximize performance according to a current channel state, a UE at least one of the above configurations to a base station. Thereafter, the UE performs CSI calculation and feedback according to a reported configuration value and receives data.

For example, if the UE determines that time variation in a vertical direction of a channel is not big, the UE feeds back i11 (or i2) only and applies a beam cycling on the remaining partial PMI. Additionally, the UE reports a beam cycling set, a beam cycling resource unit and the like for the remaining partial PMI to the base station. Based on the configuration value reported to the base station, the UE calculates and feeds back CSI. Namely, the UE selects an RI and an i22 value, which can achieve a highest CQI when a beam cycling is performed with the reported beam cycling set and the reported beam cycling resource unit (under the condition that a targeted BLER (block error rate) is satisfied), and reports them together with a CQI. The base station transmits data in an open loop according to an open-loop configuration value reported by the UE.

For another example, if the UE determines that time variation of a phase change between an h-pol antenna and a v-pol antenna forming an X-pol is big despite that timevariations of vertical and horizontal directions of a channel is not big, the UE makes a report, which indicates that beam selector portions of i1 and i2 are fed back only and that a cycling is performed on the remaining partial PMI (i.e., a co-phase of i2), to the base station. Additionally, the UE reports a beam cycling set, a beam cycling resource unit and the like for the remaining partial PMI to the base station. Based on the configuration value reported to the base station, the UE calculates and feeds back CSI. Namely, the UE selects beam selectors of RI, i1 and i2, which can achieve a highest CQI when a beam cycling is performed with the reported beam cycling set and the reported beam cycling resource unit (under the condition that a targeted BLER (block error rate) is satisfied), and reports them together with a CQI. The base station transmits data in an open loop according to an open-loop configuration reported by the UE.

For further example, if the UE determines that a closed loop can be performed owing to small time variation of a channel, the UE makes a request or report for a closed-loop transmission scheme and performs legacy closed-loop feedback. Having received the request or report, the base station transmits data in a closed loop. On the other hand, if determining that an open loop should be performed due to big time variation of a channel, the UE makes a request or report for an open-loop transmission scheme and performs open-loop feedback. Having received the request or report, the base station transmits data in an open loop. In doing so, the UE can designate and report an open-loop transmission scheme.

Since the above informations reported by the UE need not to be sent frequently, the UE can sent them together with an RI or CRI having a long-term period. Of course, reporting them together with CQI/PMI can be considered as well. Or, after configuring a new period amounting to a multiple of a period of RI or CRI, it is preferable that the above informations are reported by working to the new period.

The above-described informations may be designated to the UE by the base station through RRC or DCI signaling to the contrary. The base station designates the above informations in a CSI process, and the UE calculates and reports a CSI of the corresponding CSI process based on the designated informations. For example, the base station configures 3 CSI processes (e.g., CSI processes 1 to 3) for the UE and designates closed-loop feedback to the CSI process 1. And, i11 is fed back to the CSI process 2 and the remaining partial PMI designates cyclically applied open-loop CSI feedback. Moreover, i1 is fed back to the CSI process 3 and the remaining partial PMI designates cyclically applied open-loop CSI feedback. The UE calculates and reports a CSI of each CSI process to be appropriate for the designated scheme, and the base station receives CSI on the three types of the CSI processes. Thereafter, the base station transmits data to the UE by an optimal transmission scheme based on the CSI.

Since data is transmitted together with a DM-RS, the UE may select the data by the same scheme irrespective of the selected transmission scheme. Yet, in some cases, data may be transmitted by an open-loop transmission scheme in which a beamforming applied to the data and a beamforming applied to the DM-RS are different from each other. Considering such possibility, the base station can inform the UE that the data was transmitted to the UE by a prescribed transmission scheme, through DCI. For example, through DCI, the base station can inform the UE that the data was transmitted using a prescribed one of the above CSI processes.

<Beam Cycling for Semi-Open-Loop Transmission in 4Tx Codebook>

In an 8Tx codebook, as a beam group of W1 is configured with highly correlated beams, a structure of feeding back W1 and cyclically applying W2 is appropriate. Yet, in a 4Tx codebook, as a beam group of W1 is configured with lowly correlated beams, a structure of feeding back W1 and cyclically applying W2 is not appropriate. For the cyclic application between highly correlated beams in the 4Tx codebook, a method of feeding back or fixing W2 and cycling a co-phase of W1 and W2 is necessary.

For example, if W2 is determined according to a specific beam of W 1, as W1 is cycled in a set (e.g., W1∈{0,1,2,3}) configured with adjacent PMIs, beams configured with highly correlated beams are cycled eventually.

Additionally, as a co-phase of W2 is cycled, an open-loop scheme similar to that of an 8Tx codebook is applicable to a 4Tx codebook as well. Namely, in case of using the Release-12 4Tx codebook, a UE feeds back a selector of W2 but does not feed back a remaining partial PMI. On the assumption that the remaining partial PMI is cyclically applied by a determined method, the UE searches for optimal values of W2, RI and CQI.

<PUCCH Report Type in Semi-Open-Loop Transmission>

In a semi-open-loop transmission or an open-loop transmission, unlike a closed-loop transmission, a UE does not feed back a partial PMI component. As a result, a report type of PUCCH CSI feedback should be newly defined. Through such optimization, a feedback overhead can be reduced. Yet, by intactly maintaining a report type used for a CSI report of a legacy closed-loop scheme, it is able to feed back an unnecessary partial PMI (i.e., a partial PMI cycled by a previously determined method or a partial PMI to be used stationarily).

Particularly, an unnecessary PMI is fed back in a manner of being padded with dummy bits and not used by a base station. By configuring the dummy bits with bits agreed by the base station and the UE, a coding gain can be increased for a dummy bit transmitted report type. For example, an unnecessary partial PMI is reported by being always configured as 0 (i.e., a first PMI). For another example, although a selector of W2 is valid feedback in an open-loop transmission, if a co-phase is cycled, the UE searches for W2 corresponding to the calculated selector and a first co-phase and then reports the found W2. Hence, the base station and the UE can be regarded as agreeing to a fact that a co-phase is fed back by being always fixed to a first co-phase.

In an open-loop transmission, a report type used for a closed-loop transmission is used as it is but a CSI calculation should be performed in a manner of calculating a CSI on the assumption of an open-loop transmission as described above. Likewise, in PUSCH feedback, an unnecessary partial PMI is reported in a manner that the corresponding part is padded with dummy bits.

<(Semi) Open-Loop Transmission Using LC Codebook>

In the LTE standard, a Linear Combination (LC) codebook is considered for more accurate PMI feedback. The LC feedback is schematically described as follows.

A UE can report a beam vector set configured with beam vectors through W1, which is similar to the role and structure of the legacy W1. The UE generates a new beam vector by linearly combining beam vectors corresponding to W1 through W2. In doing so, coefficients used for the linear combination are selected through W2. For example, if a beam set {v1, v2, v3, v4} is configured with W1, a coefficient set to be used for linear combination of a beam like c1v1+c2v2+c3v3+c4v4 or a coefficient vector {c1, c2, c3, c4} is designated through W2. Additionally, a co-phase to be applied to a V-pol group antenna and an H-pol group antenna like the legacy W2 can be still delivered through W2. Equation 37 in the following shows generation of final rank 1 PMI that applies both a co-phase, which is a phase rotation value, and a coefficient vector.

$$\begin{bmatrix} \sum_{i=0}^{n} c_i v_i \\ \alpha \sum_{i=0}^{n} c'_i v'_i \end{bmatrix}$$ [Equation 37]

In Equation 37, α indicates a co-phase. By limiting to ci=c'i and vi=v'I for a simple codebook design, a beam direction corresponding to an H-pol antenna and a V-pol antenna can be always configured as same.

If a semi-open loop is operated using such an LC codebook, a base station and a UE can cycle a coefficient vector by a determined method. This is described in detail.

A UE feeds RI, W1 and CQI back to a base station. The UE may not feed W2 back or feed a co-phase component of W2 only. When calculating CSI (i.e., CQI, RI, a fed-back partial PMI), the UE assume that data is transmitted by cyclically applying a coefficient vector according to a resource (e.g., RE, RE group, RB, or RB group). For example, it is able to assume that coefficient vectors $c_0$, $c_1$, $c_2$, $c_3$ are cyclically applied in an RB unit. If the coefficient vectors are cycled in the RB unit, the coefficient vector applied to an $i^{th}$ RB is $c_{i\%4}$ (here, % means a modulo operation), which can be agreed between the base station and the UE.

A cycling scheme of a coefficient vector may be fixed. Or, the base station may inform the UE of a cycling scheme to be used for CSI calculation or a cycling scheme to be assumed in current data reception through higher layer signaling (e.g., RRC signaling). Or, the base station determines several cycling schemes for the UE through higher layer signaling and then informs the UE of them through DCI. Or, the base station determines several cycling schemes for the UE through higher layer signaling, and the UE may report the cycling scheme used in CSI calculation together with CSI or inform the base station of it through an uplink control channel.

Additionally, a co-phase that is a phase rotation value can be cycled. A co-phase cycling is performed in a unit smaller than a beam cycling resource unit of a coefficient, or in a unit greater than a beam cycling resource unit of a coefficient to the contrary.

<W1 Feedback Method in CM-RS Based DL Transmission>

According to the current LTE standard, W1 of a class A CSI report is not fed back separately by being sorted into i11 or i12. Instead, i1 is determined by i12 and i12 and the i1 is then fed back. Hence, in order to feed i11 or i12 back only in an open loop, a new scheme for feeding i11 or i12 back only should be considered.

According to a first scheme, if a base station appropriately configures Codebook Subset Restriction (CBSR) on W1 for a UE, although the UE reports i1, it may bring the same effect as reporting i11 (or i12) only. As described above, in a class A codebook, there exists a DFT vector oversampled for each of a vertical direction and a horizontal direction. A DFT vector (or a DFT vector set) in one direction is selected through i11 and a DFT vector (or a DFT vector set) in the other direction is selected through i12. Thereafter, a beam vector (or a beam vector set) of final W1 is configured by applying Kronecker product of the selected DFT vector (or vector set) in one direction and the selected DFT vector (or vector set) in the other direction.

In case of through CBSR, putting restriction on making a report only if i12 is 0, the UE calculates i11 only and also calculates and reports i1 using the calculated optimal i11 and 'i12=0'. When calculating i11, on the assumption that data is transmitted by applying a beam cycling to i12 according to a determined scheme, the UE selects and reports optimal i11 that maximizes CQI.

Of course, optimal i11, which maximizes CQI on the assumption that data is transmitted in a manner that a beam cycling is applied to i2 by a determined scheme as well as to i12, is selected and reported. For example, if W1, in which i11 and i12 are defined as {0, 1, 2 . . . 16} and {0, 1, 2 . . . 16}, respectively, is configured and it is restricted to make a report by CBSR only if i12 is 0, the UE finds and reports optimal i11 by assuming that i12 or i2 is cycled for each i11 by a determined scheme and then applied to a data transmission.

Likewise, in case that the UE reports i12 only, the UE can operate correctly in a manner of restricting i11 to 0 through CBSR in the above operation and exchanging roles of i11 and i 12 with each other. The base station can inform the UE of the following UE operation together with CBSR. Namely, it is indicated whether to calculate i11 (or i12) by cycling i12 (or i11) corresponding to an i1 component of which report is restricted due to CBSR or i11 (or i12) by fixing i12 (or i11) corresponding to an i1 component of which report is restricted due to CBSR. The former is a new operation for a semi-open loop, and the latter corresponds to a legacy UE operation.

According to a second scheme, a UE directly feeds i11 (or i12) back to a base station. Unlike that a legacy UE reports i1, a new UE operating in a semi-open loop directly calculates and reports i11 (or i12) configuring i1. When the UE calculates i11, the UE selects and reports optimal i11 that maximizes CQI on the assumption that data transmission is performed in a manner of applying a beam cycling to i12 or i2 by a determined scheme. In this case, as a feedback payload of i11 gets smaller than a feedback payload of i1, an uplink control overhead can be lowered.

According to a third scheme, by introducing codebook subsampling, a UE can bring about the same effect as actually reporting i11 (or i12) only despite reporting i1. Namely, a subset of i1 is configured in a manner that i12 and i11 have 0 and an arbitrary value through subsampling, respectively. Particularly, the subset of i1 is configured by selecting a value having i12 correspond to 0 from i1 values and the UE feeds back a single value in the subset. As a result, similarly to the above-described first scheme, i1 that can be calculated and reported among the entire i1 is restricted and i1 is determined as optimal i11 and i12=0. When the UE calculates i11, on the assumption that data is transmitted by applying a beam cycling to i12 according to a determined scheme, the UE selects and reports optimal i11 that maximizes CQI.

Of course, optimal i11, which maximizes CQI on the assumption that data is transmitted in a manner that a beam cycling is applied to i2 by a determined scheme as well as to i12, is selected and reported. For example, if W1, in which i11 and i12 are defined as {0, 1, 2 . . . 16} and {0, 1, 2 . . . 16}, respectively, is configured and it is restricted to make a report by codebook subsampling only if i12 is 0, the UE finds and reports optimal i11 by assuming that i12 or i2 is cycled for each i11 by a determined scheme and then applied to a data transmission. Likewise, in case that the UE reports i12 only, the UE can operate correctly in a manner of restricting i11 to 0 through subsampling in the above operation and exchanging roles of i11 and i12 with each other. In case of using subsampling, as a payload size of i1 is reduced, uplink resources can be saved more than CBSR.

Additionally, the base station can inform the UE of the following UE operation. Namely, it is indicated whether to calculate i11 (or i12) by cycling i12 (or i11) corresponding to an i1 component of which report is restricted due to subsampling or i11 (or i12) by fixing i12 (or i11) corresponding to an i1 component of which report is restricted due to subsampling. The former is a new operation for a semi-open loop, and the latter corresponds to a legacy UE operation.

According to a fourth scheme that is a modification of the first scheme, a base station does not directly indicating CBSR. Instead, in case that the base station configures a semi-open-loop transmission mode, a UE reports i1 by applying a previously determined CBSR. For example, if the base station configures a semi-open-loop transmission mode, the UE calculates i11 by applying CBSR configured as i12=0 and then reports the calculated i11 and i 1 corresponding to i12=0. A scheme of calculating i11 is identical to that of the first scheme. Additionally, when the base station configures a semi-open-loop transmission mode, the base station may signal, to the UE, whether the UE applies CBSR configured as i12=0 or CBSR configured as i11=0. In doing so, the base station only signals which one of the two CBSRs the UE can apply, instead of directly configuring CBSR.

Similarly to the above description, according to the subsampling scheme that is the third scheme, the base station can inform the UE that i1 will be reported by applying a prescribed one of several subsamplings. For example, it is indicated that i1 will be reported by applying which one of subsampling configured as i11=0 and subsampling configured as i12=0.

In the above description, a method for a UE to feed i1 back by restricting i12 of a class A codebook to 0 and freely selecting i11 (or i12) is described. In this case, a set of the generated i1 (i.e., a set of i1 that can be fed back by the UE) include codebook parameters (N1, N2, O1, O2) signaled to the UE by the base station and codebook parameters (s1, s2) and can be represented as i1={0, (N2*O2/s2), (2*N2*O2/s2), (3*N2*O2/s2) . . . ((N1*O1/s1−1)*N2*O2/s2)}.

When i1 is selected as (K*N2*O2/s2) from the above set, the UE performs a beam cycling of i12 for CQI calculation for an open-loop transmission. As a result, a set of the beam cycled i1 is represented as i1={(K*N2*O2/s2), (K*N2*O2/s2)+1, (K*N2*O2/s2)+2 (K*N2*O2/s2)+(N2*O2/s2)−1}.

Additionally, a beam cycling can be performed on W2, and the beam cycled i1 and W2 can be cycled independently. Namely, as described above, if the beam cycling of i1 is defined for (N2*O2/s2), all W2 is cycled for each i1 index. In case that the beam cycling of W2 is performed on M W2 indexes, there exist total [(N2*O2/s2)*M] beam cyclings by W1 and W2. Yet, if a PDSCH RB resource is small or granularity of a cycled resource is big, there occurs an event that total [(N2*O2/s2)*M] beams cannot be cycled entirely. Hence, instead of cycling W1 and W2 independently, by combining the two indexes and then cycling the combined indexes, all the beams can be preferably cycled in PDSCH RB. For example, preferably, a beam cycling unit U of W2 is made by dropping decimal for M/(N2*O2/s2) and W2 is beam-cycled as {0, U, 2U, 3U . . . }.

The above description is made on the assumption that i12 is restricted to 0. On the contrary, it is applicable to a case of freely selecting i12 by restricting i11 to 0. Yet, parameters N1, O1, s1, N2, O2 and s2 should be changed into N2, O2, s2, N1, O1 and s1, respectively.

Preferably, a PMI partially reported through a semi-open loop is always restricted to a wideband (WB). Since a semi-open loop is generally used in an environment in which a channel changes fast, if a PMI averagely optimal for a wide frequency resource is reported, it is robust to channel time-variation. If a partial PMI optimal for a subband (SB) is calculated, since there are less frequency axis channel samples, an optimal PMI in various specific channel environments is found. Yet, such a PMI is vulnerable to channel time-variation.

Figure 10:
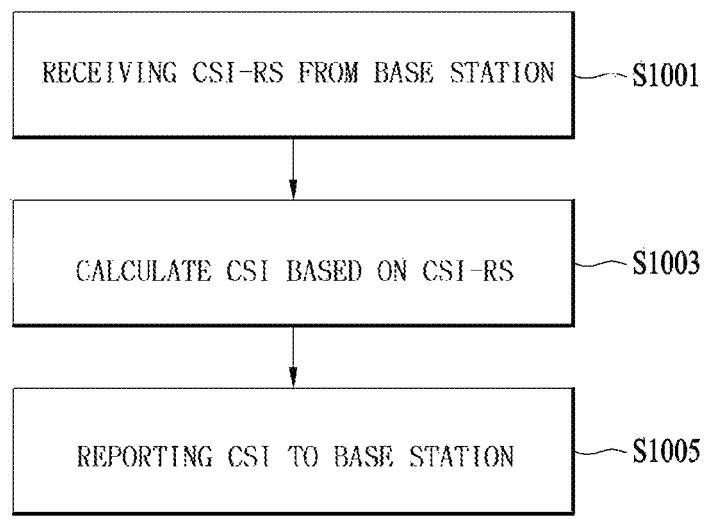
FIG. 10 is a flowchart for an example for a UE to report CSI according to an embodiment of the present invention.

FIG. 10 is a flowchart for an example for a UE to report CSI according to an embodiment of the present invention.

Referring to FIG. 10, in a step S1001, in order to report Channel Status Information (CSI) for a downlink transmission, a UE receives a Channel Status Information-Reference Signal (CSI-RS) from a base station.

Thereafter, in a step S1003, on the assumption that a dual precoder including a first precoder and a second precoder is applied, the UE calculates the CSI based on the CSI-RS. Particularly, the UE assumes that at least one of the first and second precoders is cyclically applied within a prescribed precoder candidate set in a previously determined resource unit. Moreover, information on the at least one precoder and information on the prescribed precoder candidate set are preferably provided from the base station through Radio Resource Control (RRC) layer signaling.

Additionally, the preset resource unit is determined based on a size of a resource allocated for the downlink transmission and may be provided from the base station through the RRC layer signaling. In this case, if the size of the resource allocated for the downlink transmission is equal to or greater than a threshold, the preset resource unit is at least one resource block unit. If the size of the resource allocated for the downlink transmission is smaller than the threshold, the preset resource unit is at least one resource element unit.

Finally, in a step S1005, the UE reports the CSI to the base station. Particularly, through the RRC layer signaling, the information on the at least one precoder configuring the CSI is preferably provided in advance.

Figure 11:
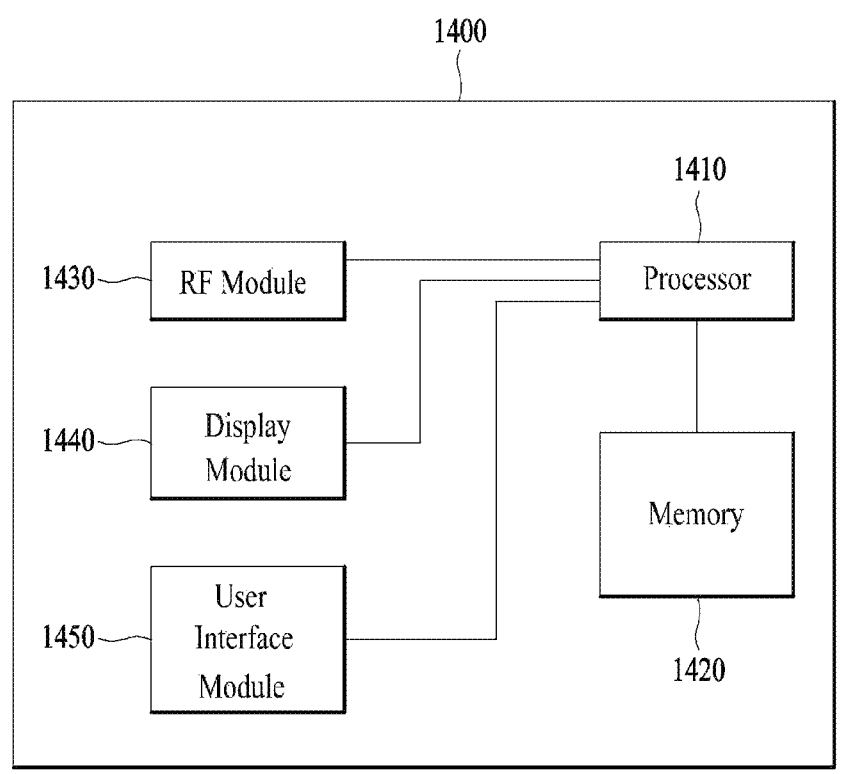
FIG. 11 is a block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal.

For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method of transmitting feedback information for DM-RS based open-loop downlink transmission in a wireless communication system and apparatus therefor are described centering on examples applying to the 3GPP LTE system, they are applicable to various wireless communication systems as well as to the 3GPP LTE system.

What is claimed is:

1. A method of receiving Channel Status Information (CSI) from a user equipment (UE) by a base station (BS) in a wireless access system, the method comprising:
transmitting a Channel Status Information-Reference Signal (CSI-RS) to the UE; and
receiving, from the UE, the CSI including channel quality information (CQI) and only a first precoder among dual precoders comprising the first precoder and a second precoder,
wherein the CQI is calculated by the UE on the assumption that that second precoder is selected from a precoder candidate set and applied per a specific number of resource blocks configured by a radio resource control (RRC) layer signaling, within a bandwidth for calculating the CQI.

2. The method of claim 1, further comprising:
transmitting information related to the precoder candidate set via the RRC layer signaling.

3. The method of claim 2, wherein the information related to the precoder candidate set includes phase rotation values related to the second precoder.

4. The method of claim 1, wherein the specific number is determined based on a size of resources allocated for a downlink data signal.

5. The method of claim 1, further comprising:
precoding a downlink data signal by being bundled per the specific number of resource blocks; and
transmitting the downlink data signal to the UE.

6. A base station (BS) in a wireless communication system, the BS comprising:
a memory; and
at least one processor coupled to the memory,
wherein the at least one processor is configured to:
transmit a Channel Status Information-Reference Signal (CSI-RS) to a user equipment (UE); and
receive, from the UE, Channel Status Information (CSI) including channel quality information (CQI) and only a first precoder among dual precoders comprising the first precoder and a second precoder,
wherein the CQI is calculated by the UE on the assumption that that second precoder is selected from a precoder candidate set and applied per a specific number of resource blocks configured by a radio resource control (RRC) layer signaling, within a bandwidth for calculating the CQI.

7. The BS of claim 6, wherein information related to the precoder candidate set is transmitted via the RRC layer signaling.

8. The BS of claim 7, wherein information related to the precoder candidate set includes phase rotation values related to the second precoder.

9. The BS of claim 6, wherein the specific number is determined based on a size of resources allocated for a downlink data signal.

10. The BS of claim 6, wherein the at least one processor is further configured to:
precode a downlink data signal by being bundled per the specific number of resource blocks; and
transmit the downlink data signal to the UE.

* * * * *

UNITED STATES PATENT AND TRADEMARK OFFICE
CERTIFICATE OF CORRECTION

| | |
|---|---|
| PATENT NO. | : 11,031,976 B2 |
| APPLICATION NO. | : 16/719562 |
| DATED | : June 8, 2021 |
| INVENTOR(S) | : Hyungtae Kim et al. |

It is certified that error appears in the above-identified patent and that said Letters Patent is hereby corrected as shown below:

In the Claims

In Column 46, Line 17, Claim 1:
Delete "tion that that second precoder is selected from a pre-" and insert -- tion that second precoder is selected from a pre- --

In Column 46, Line 47, Claim 6:
Delete "tion that that second precoder is selected from a pre-" and insert -- tion that second precoder is selected from a pre- --

Signed and Sealed this
Twentieth Day of September, 2022

Katherine Kelly Vidal
*Director of the United States Patent and Trademark Office*